(12) United States Patent
Funakubo et al.

(10) Patent No.: US 9,502,916 B2
(45) Date of Patent: Nov. 22, 2016

(54) POWER LEVELING CONTROL DEVICE AND POWER LEVELING CONTROL METHOD

(71) Applicant: FUJITSU LIMITED, Kawasaki-shi, Kanagawa (JP)

(72) Inventors: Toshiaki Funakubo, Kawasaki (JP); Yasuhiro Endo, Ebina (JP)

(73) Assignee: FUJITSU LIMITED, Kawasaki (JP)

( * ) Notice: Subject to any disclaimer, the term of this patent is extended or adjusted under 35 U.S.C. 154(b) by 497 days.

(21) Appl. No.: 14/158,947

(22) Filed: Jan. 20, 2014

(65) Prior Publication Data

US 2014/0132071 A1    May 15, 2014

Related U.S. Application Data

(63) Continuation of application No. PCT/JP2011/068992, filed on Aug. 23, 2011.

(51) Int. Cl.
*H02J 3/32* (2006.01)
*H02J 7/00* (2006.01)

(52) U.S. Cl.
CPC .............. *H02J 7/0068* (2013.01); *H02J 3/32* (2013.01); *Y10T 307/527* (2015.04)

(58) Field of Classification Search
CPC ........ H02J 3/32; H02J 3/28; H02J 2003/003; H02J 3/005; H02J 7/0068; H02J 7/04; H02J 7/042; Y10T 307/527
See application file for complete search history.

(56) References Cited

U.S. PATENT DOCUMENTS

| | | | | |
|---|---|---|---|---|
| 8,219,259 B2* | 7/2012 | Haugh | ..................... | H02J 3/32 700/286 |
| 8,779,724 B2* | 7/2014 | Ichikawa | ................. | H02J 3/32 320/134 |
| 8,854,004 B2* | 10/2014 | Lee | ......................... | H02J 3/383 320/101 |
| 9,071,068 B2* | 6/2015 | Nishikawa | ............ | H01M 10/44 |

(Continued)

FOREIGN PATENT DOCUMENTS

| JP | 2003-299247 A | 2/1999 |
|---|---|---|
| JP | H11-41831 A | 2/1999 |

(Continued)

OTHER PUBLICATIONS

International Search Report, mailed in connection with PCT/JP2011/068992 and mailed Dec. 13, 2011.

(Continued)

*Primary Examiner* — Ryan Johnson
(74) *Attorney, Agent, or Firm* — Fujitsu Patent Center

(57) ABSTRACT

The processor of a power leveling control device acquires electric cell residue of an electric cell device in each monitoring time, calculates an electric cell residue representative value representing a transition of an electric cell residue in the period based on an acquired electric cell residue, and determines a variation with respect to the current leveling target value based on the electric cell residue representative value. The processor determines a leveling target value changed by the determined variation for power leveling for use in the next period, and controls the power to be supplied from a power supply and an electric cell device to a load based on the leveling target value for power leveling in the next period. Thus, the leveling control may be performed depending on the power supply and the power use situation of a load.

15 Claims, 26 Drawing Sheets

(56) References Cited

U.S. PATENT DOCUMENTS

| | | | |
|---|---|---|---|
| 2011/0089905 A1* | 4/2011 | Yano | B60K 6/46 320/132 |
| 2014/0015469 A1* | 1/2014 | Beaston | H02J 3/32 320/101 |

FOREIGN PATENT DOCUMENTS

| | | |
|---|---|---|
| JP | 2002-17044 A | 1/2002 |
| JP | 2009-213319 A | 9/2009 |

OTHER PUBLICATIONS

Notification of Transmittal of Translation of the International Preliminary Report on Patentability (Form PCT/IB/338, Form PCT/IB/373 & Form PCT/ISA/237), PCT/JP2011/068992, 6 pages, dated Mar. 6, 2014.

* cited by examiner

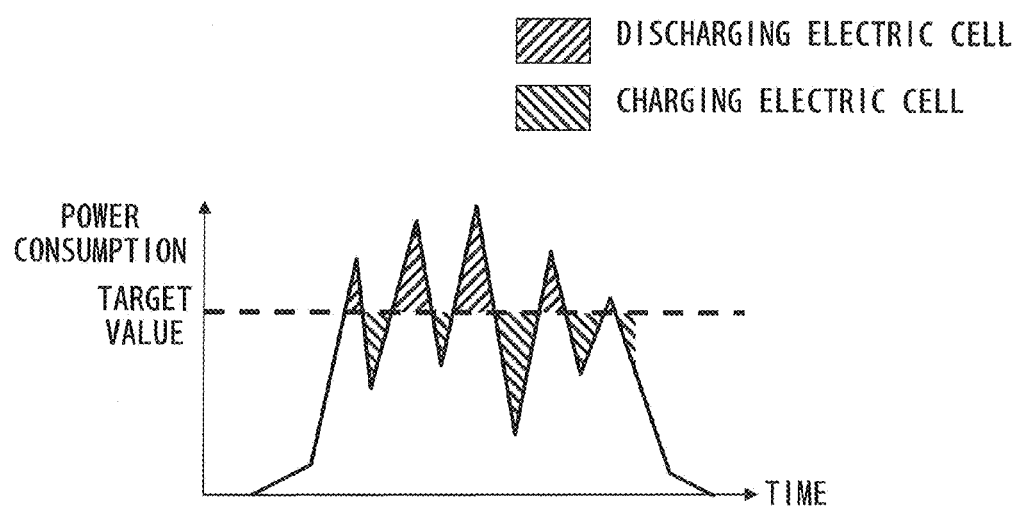
F I G. 2

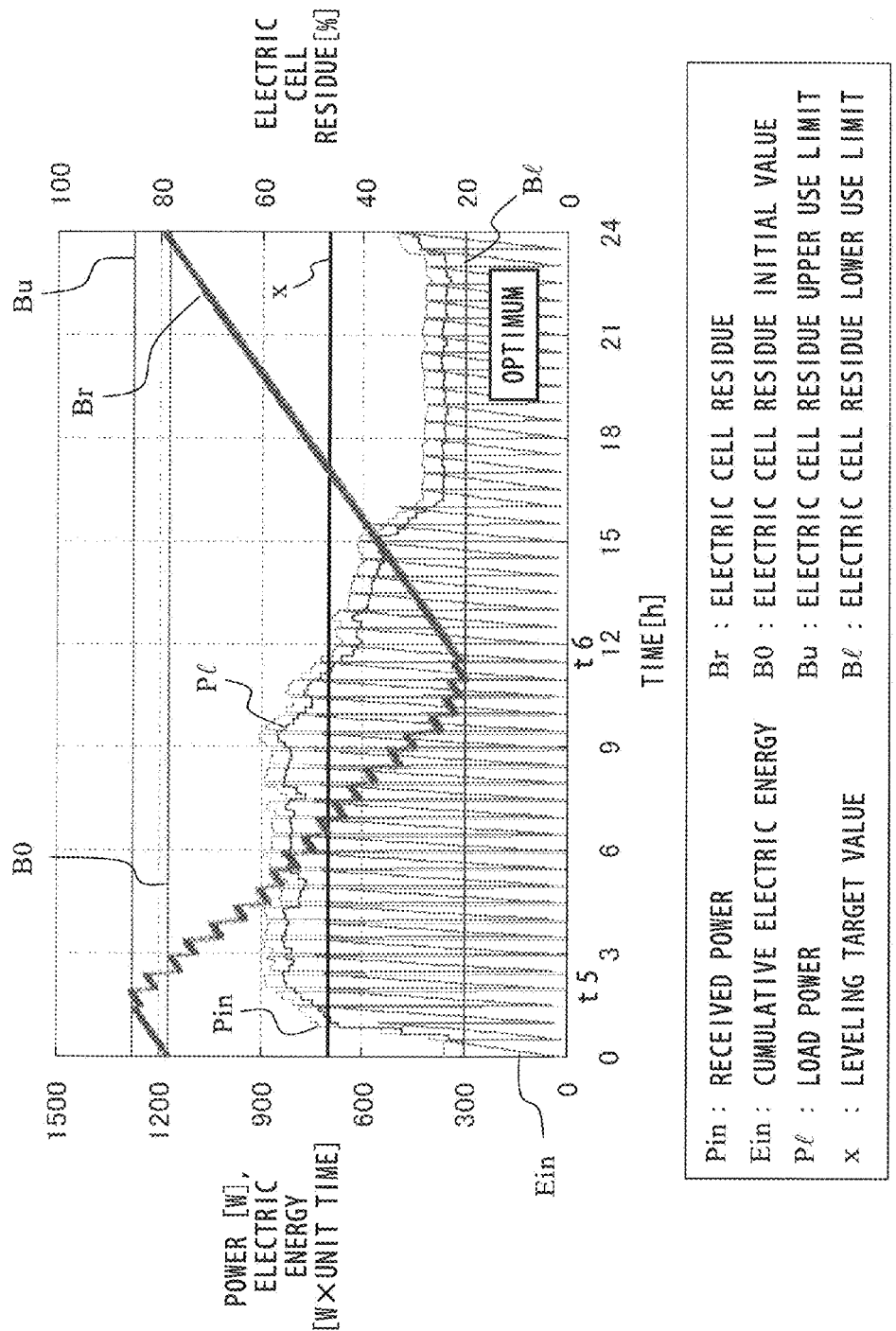
F I G. 4

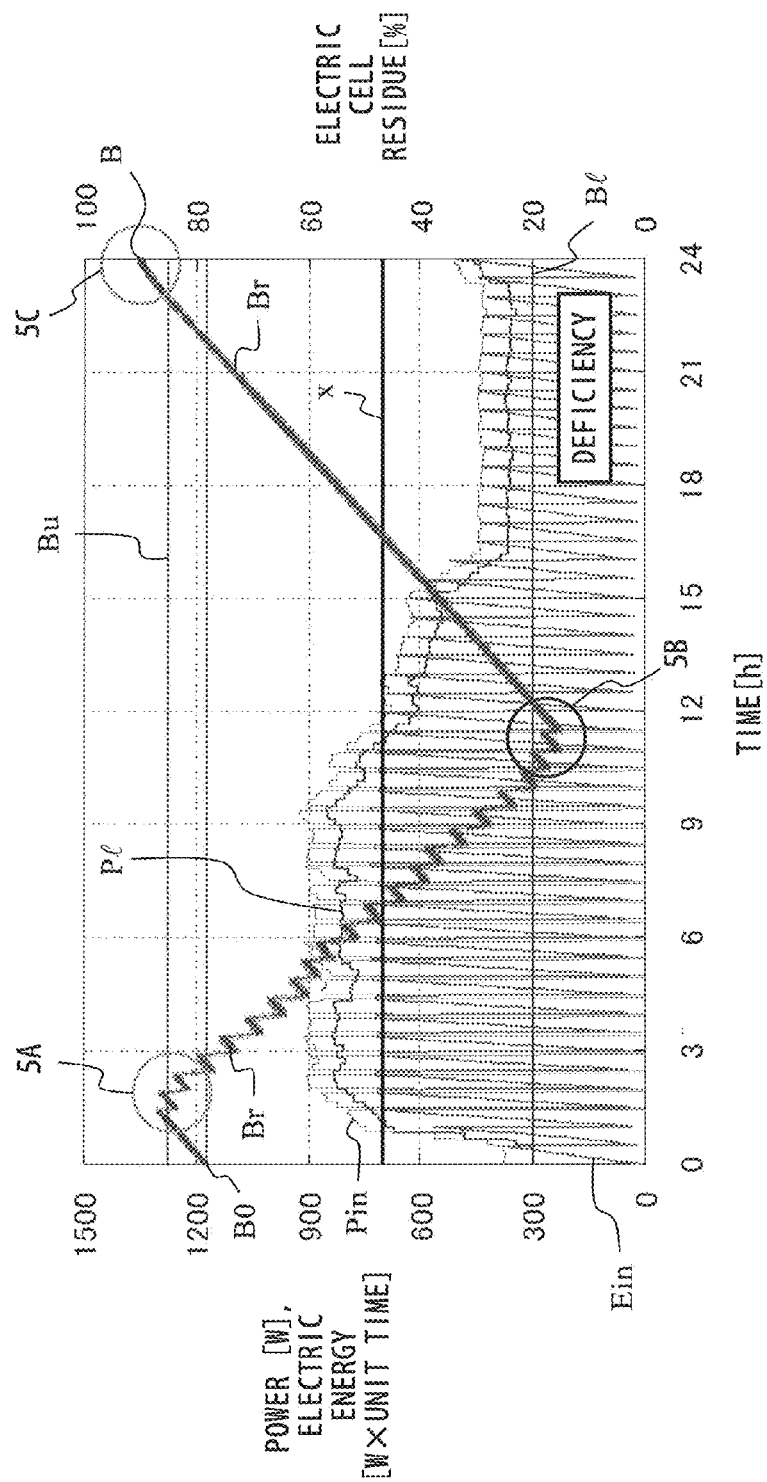
F I G. 5

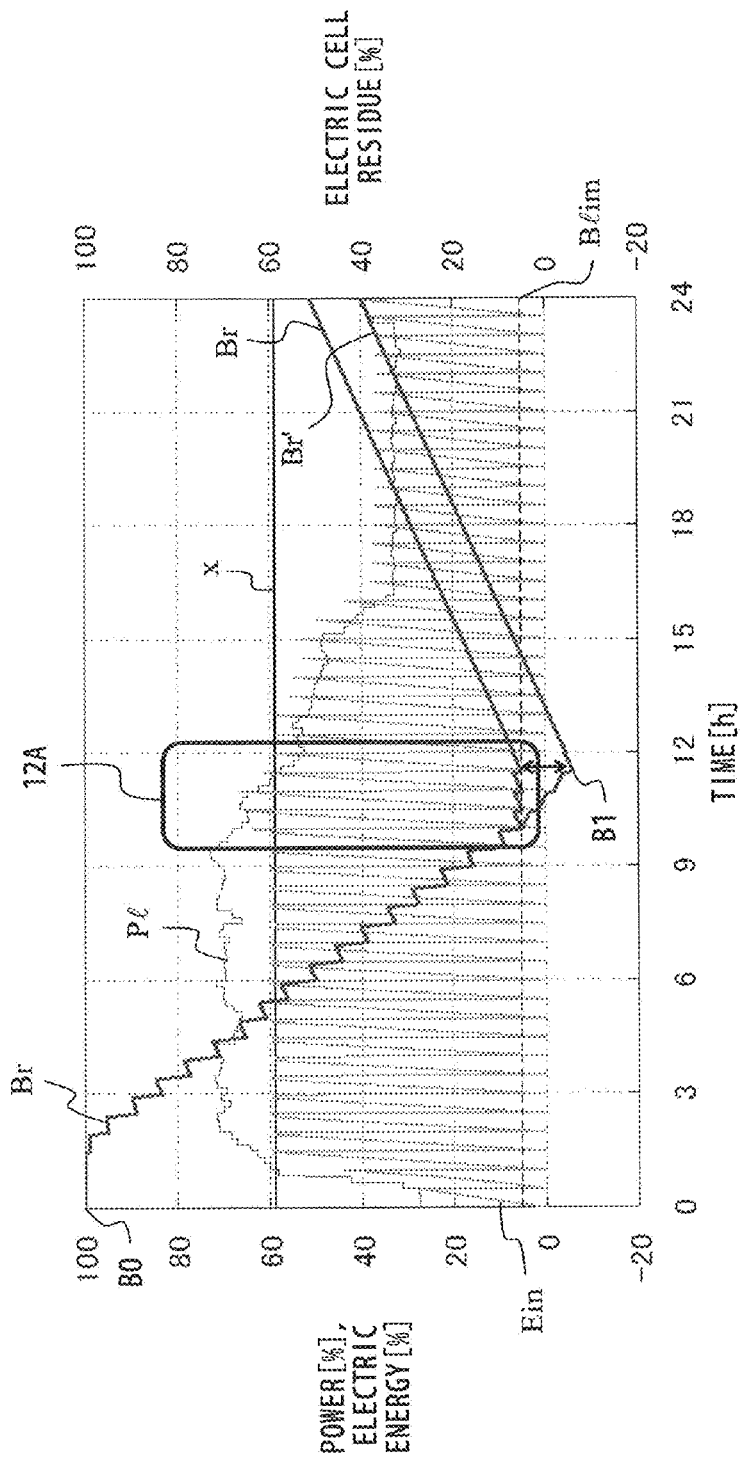
F I G. 12

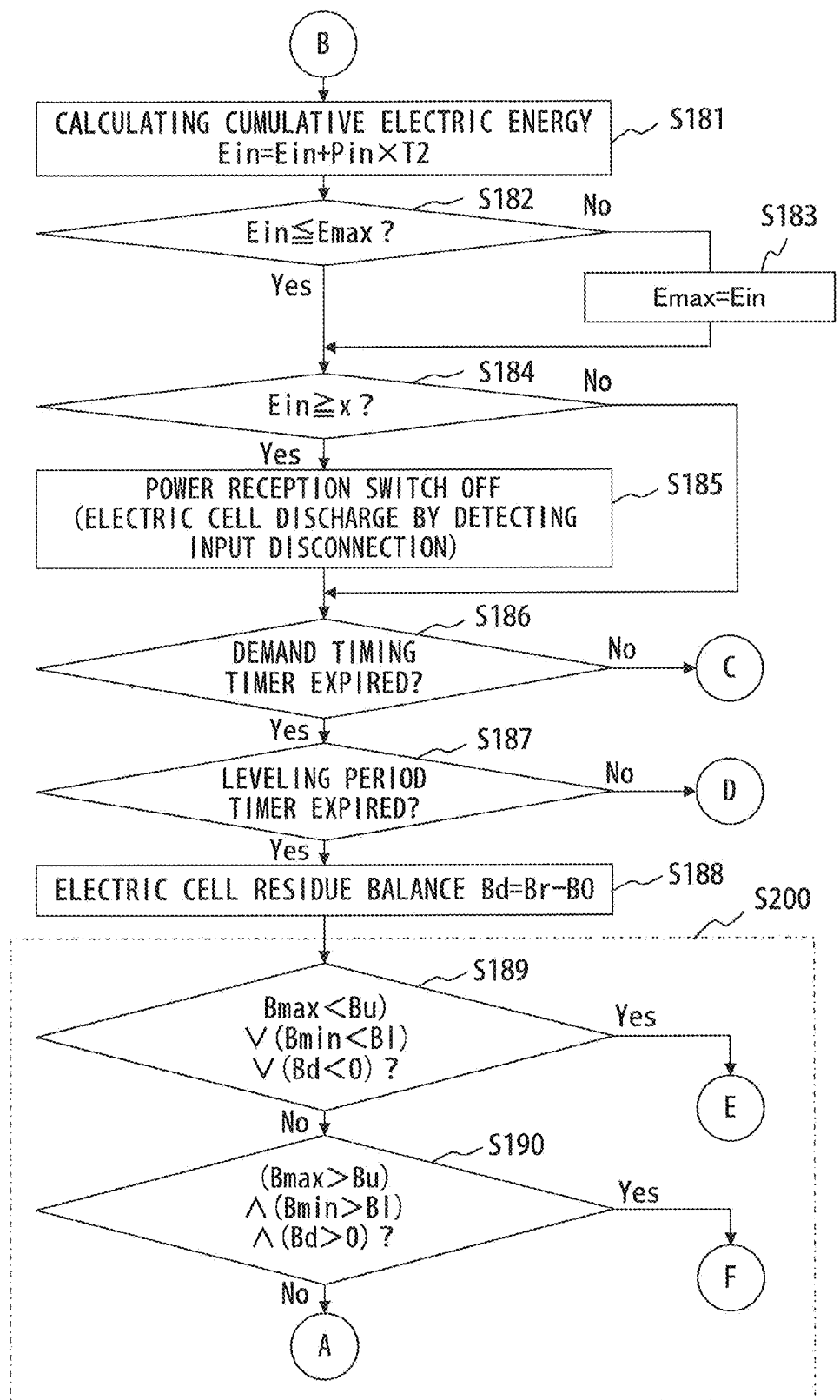
F I G. 21

POWER LEVELING CONTROL DEVICE AND POWER LEVELING CONTROL METHOD

CROSS-REFERENCE TO RELATED APPLICATION

This application is a continuation application of International Application PCT/JP2011/68992 filed on Aug. 23, 2011 and designated the U.S., the entire contents of which are incorporated herein by reference.

FIELD

The embodiments discussed herein are related to a power leveling control device and a power leveling control method.

BACKGROUND

The tendency of demanded power depends on various factors. Therefore, power facilities are designed according to the peak of the demand so that the power facilities may be normally operated even when the power demand reaches the maximum value. With the power facilities, an attempt is made to meet the demand by electric cell power using an electric cell device when the demand is large and store power in the electric cell device when the demand is small with the environmental problem, the cost problem, etc. taken into account, thereby performing a leveling operation and reducing the peak of power demand. If the peak of the demand may be reduced and the fluctuation of the demand may be leveled as described above, then the demand load rate of power generation in an operation mode in which an output fluctuation may be suppressed as much as possible may be raised, thereby realizing carbon dioxide ($CO_2$) emission lowering and cost reduction.

In the leveling control using an electric cell device, an output target value is set, a residue may be charged in the electric cell device when the demanded power of a load is smaller than the output target value, and a deficiency may be discharged from the electric cell device when the demanded power is larger than the output target value. In this case, there is an example in which the load of a power supply is leveled by measuring the electric energy actually used by the load, and changing the plan of the discharged energy of the electric cell device when the measured value is deviated from an allowable limit. There is also an example in which an output of a power supply and the amount of storage of an electric cell device are detected, and an average value of the output in a preset period is corrected by a target value set depending on the amount of storage, thereby setting an output target value. Furthermore, there is also an example in which an average value of the spent power from the start of the demand timing to the current time based on the information about the spent power, the electric cell device is discharged when the average value exceeds a first specified value, and it is charged when the average value is smaller than a second specified value.

[Patent Document 1] Japanese Laid-open Patent Publication No. 11-41831
[Patent Document 2] Japanese Laid-open Patent Publication No. 2002-17044
[Patent Document 3] Japanese Laid-open Patent Publication No. 2003-299247

SUMMARY

According to an aspect of the embodiments, a power leveling control device levels the power supplied from a power supply in a system in which a power supply is connected to an electric cell device and a load. The power leveling control device includes a storage device and a processor. The processor is configured to acquire an electric cell residue of the electric cell device in each monitoring time, to store the electric cell residue of the electric cell device in the storage device, to calculate an electric cell residue representative value indicating a transition of the electric cell residue in the period based on the stored electric cell residue at an end of a period in which it is predicted that a period of high power demand of a load and a period of low power demand alternately appear, to determine a leveling target value for power leveling which is used in the next period and changed by a variation by determining the variation with respect to a current leveling target value based on the electric cell residue representative value, and to control power to be supplied from the power supply and the electric cell device to the load based on a determined leveling target value for the power leveling for use in the next period.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a schematic diagram of the power leveling control according to the first embodiment;

FIG. 4 is an explanatory view of an example of the power leveling control in a leveling period according to the first embodiment;

FIG. 5 is an example of the leveling control when the electric cell residue is insufficient according to the first embodiment;

FIG. 12 is an explanatory view of the expanded electric cell residue according to the first embodiment;

FIG. 21 is a flowchart of the operation of the power leveling system according to the second embodiment of the present invention;

DESCRIPTION OF EMBODIMENTS

The above-mentioned conventional leveling control has the following problem.

When the above-mentioned leveling control is performed, it is important in operating power facilities how the output target value (hereafter referred to as a leveling target value) is to be defined. That is, if the leveling target value is too high, then the power supply relative to the power demand tends to be excessive, and the effect of reducing the peak of the power demand by the discharge of an electric cell device is reduced by decreasing the discharged energy of the electric cell device. On the other hand, if the leveling target value is too low, then the energy stored in the electric cell device becomes empty, and the peak value of the power demand becomes high. Therefore, it is preferable that the leveling target value is appropriately adjusted according to the power usage of a load. In this case, it is preferable that the change of the amount of the variation of the leveling target value is determined based on the power facilities and the power usage of a load.

However, in an example of changing a plan of a discharged energy, the plan is amended based on the prediction of a change of an amount of power used and a measurement value of an actual amount of power used, but the prediction is not always appropriate, and the plan is not always appropriately changed. In another example, it is uncertain how the amount of change is to be defined concretely.

Preferred embodiments of the present invention will be explained with reference to accompanying drawings.

First Embodiment

Figure 1:
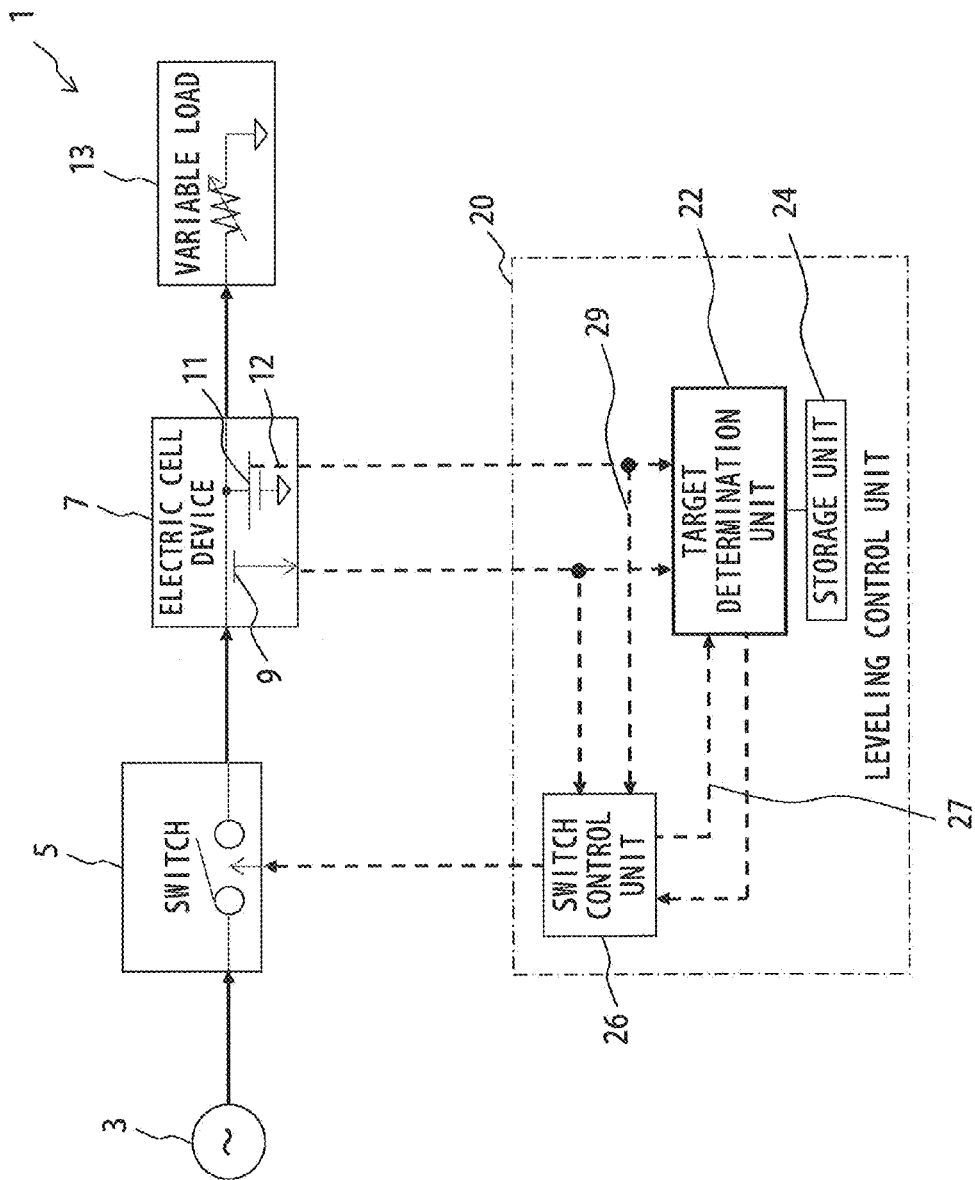
FIG. 1 illustrates a power leveling system according to the first embodiment of the present invention.

First, the configuration of a power leveling system 1 and the outline of the power leveling control according to the first embodiment are described below with reference to FIGS. 1 through 3. FIG. 1 illustrates the power leveling system 1 according to first embodiment. The power leveling system 1 includes an electric cell device 7 and a variable load 13 connected to a power supply 3 through a switch 5, and a leveling control unit 20 for control of the operation of the switch 5.

The power supply 3 is a commercial power supply. The switch 5 is connected between the power supply 3, and the electric cell device 7 and a variable load 13 so that the switch 5 may be opened and closed. The switch 5 switches the connection between the power supply 3, and the electric cell device 7 and the variable load 13 by the control of the leveling control unit 20 which opens and closes the connection. The electric cell device 7 is connected to the switch 5 and the variable load 13, and includes a received power measurement unit 9, an electric cell 11, and an electric cell residue measurement unit 12. The received power measurement unit 9 measures the received power from the power supply 3, and outputs the result to the leveling control unit 20. The electric cell 11 supplies power to the variable load 13 while charging or discharging a part of the power received from the power supply 3 depending on the open or close state of the switch 5. The electric cell residue measurement unit 12 measures the electric cell residue of the electric cell 11 and outputs the result to the leveling control unit 20. The variable load 13 is a load in common home, corporations, etc. which receive power supply and whose power consumption is variable. In FIG. 1, when the output of the power supply 3, the input/output of the electric cell 11, and the input to the variable load 13 are different between AC power and DC power, an AC-DC converter is appropriately inserted.

The leveling control unit 20 includes a target determination unit 22, a storage unit 24, and a switch control unit 26. The target determination unit 22 determines a leveling target value based on the electric cell residue stored in the storage unit 24 described later, and the received power depending on the situation, and outputs the result to the switch control unit 26. Furthermore, the target determination unit 22 stores the electric cell residue and the determined leveling target value in the storage unit 24. The target determination unit 22 also includes a leveling period timer, a demand timing timer, and a monitor control period timer, which are not illustrated in the attached drawings, and manages each period. The details of the determining method of the leveling target value are described later. Furthermore, the target determination unit 22 detects the discharge of the electric cell 11 based on the switching state acquired from the switch control unit, and stores the discharge result in the storage unit 24. Furthermore, the target determination unit 22 may store received power Pin in the storage unit 24, and calculate the peak value CF (ratio of the maximum cumulative electric energy Epk to the average cumulative electric energy Eav) based on the stored received power Pin.

The storage unit 24 is, for example, random access memory (RAM) etc. The storage unit 24 stores a program for control of the operation of the leveling control unit 20, the electric cell residue input from the electric cell device 7, the received power Pin, the determined leveling target value, etc.

The switch control unit 26 outputs the operation signal for switch of the connection state of the switch 5 based on the leveling target value determined by the target determination unit 22 and the received power and the electric cell residue input from the electric cell device 7, thereby controlling the switch 5. The switch control unit 26 is also configured to output the switching state of the switch 5 as indicated by an arrow 27.

FIG. 2 is a schematic diagram of power leveling control by the vertical axis indicating the power consumption and the horizontal axis indicating the time. As illustrated in FIG. 2, the electric cell 11 is charged when the power consumption is lower than the leveling target value, and the switch 5 is opened to supply power from the electric cell 11 to the variable load 13 when the power consumption is higher than the target value. The power consumption and the leveling target value may be electric energy per unit time.

Figure 3:
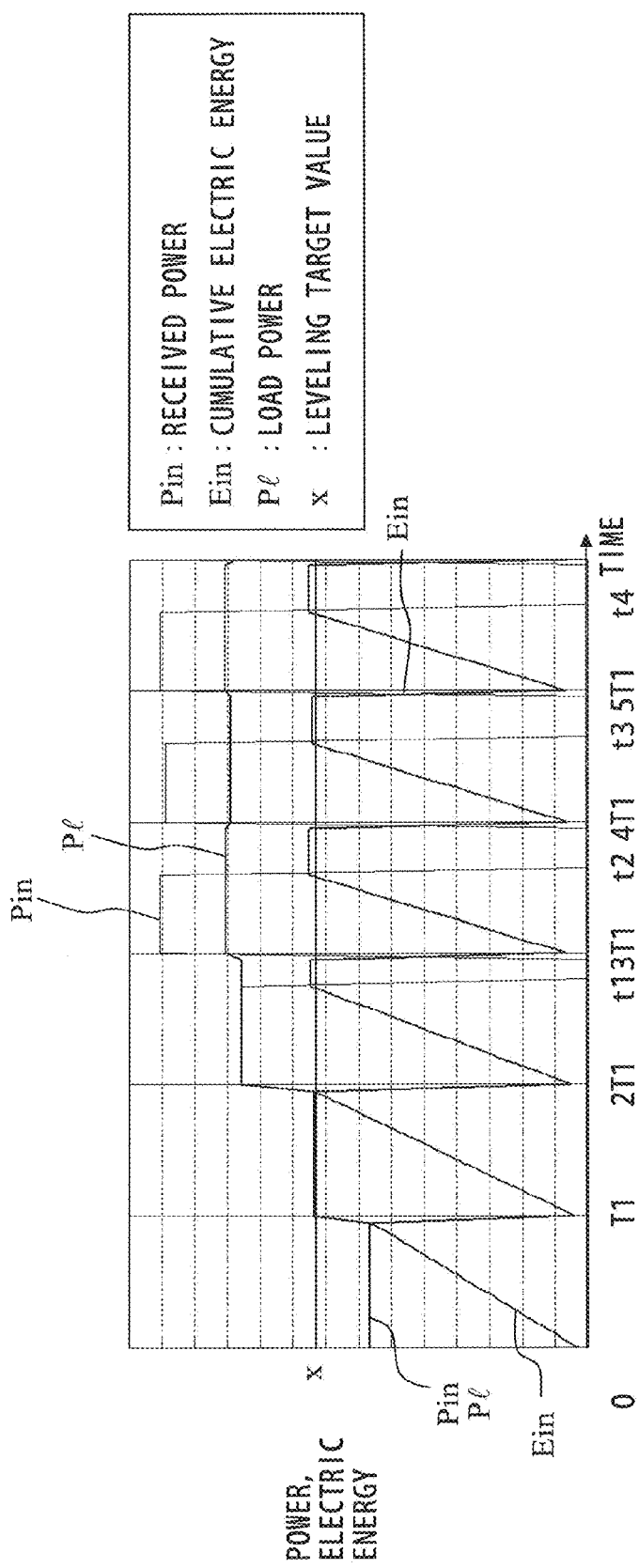
FIG. 3 is an example of power leveling control according to the first embodiment.

FIG. 3 is an example of power leveling control with the vertical axis indicating power and electric energy, and the horizontal axis indicating time. In the power leveling control, for example, the total electric energy received from the commercial power supply in the specified demand timing T1 is measured for each monitoring time T2, for example, and the received power from the power supply is controlled based on the comparison between the measured amount of the received power and the leveling target value. In the present embodiment, the received power measurement unit 9 measures the sum of the power consumption of the variable load 13 and the charged power of the electric cell 11 as the received power Pin from the power supply 3. Therefore, explained below using FIG. 3 is an example of opening and closing the switch 5 depending on whether or not the cumulative electric energy Ein obtained by accumulating the received power Pin from the power supply 3 exceeds the leveling target value at a time point in the demand timing T1. FIG. 3 illustrates the transition of the received power Pin, the cumulative electric energy Ein, and the load power Pl with the lapse of time. The received power Pin is the power measured by the received power measurement unit 9. The cumulative electric energy Ein is the electric energy obtained by accumulating the received power Pin measured by the received power measurement unit 9 as continuing for the monitoring time T2 from the starting time of the demand timing T1. The load power PL is the power consumption of the variable load 13.

As illustrated in FIG. 3, when the power consumption of the variable load 13 changes as the load power Pl, the received power Pin is equal to the load power Pl based on the electric cell as fully charged at time t=0 through t1 until the cumulative electric energy Ein reaches the leveling target value x. In addition, the cumulative electric energy Ein is electric energy accumulated in the demand timing T1, and draws a locus like a saw wave when the load power is constant at time t=0 through 2T1 when Ein is not reached to the leveling target value x. In the example illustrated in FIG. 3, the load power PL rises around time t=2T1. When the load power PL rises, the received power Pin also rises, and the cumulative electric energy Ein exceeds the leveling target value x at time t=t1, thereby releasing the switch 5 and starting the discharge of the electric cell 11. While the switch 5 is released, the received power Pin is 0. The electric cell 11 is discharged in time t=t1 through 3T1.

At time t=3T1 when the next demand timing starts, the cumulative electric energy Ein is reset. Therefore, the switch 5 is closed again, the reception of power from the power supply 3 starts, and the reception of power is performed in time t=3T1 through t2. The cumulative electric energy Ein again exceeds the leveling target value x at time t=t2, the switch 5 is released, and the electric cell 11 starts discharge. Then, the similar operations are repeated. At and after time t=3T1 after the electric cell 11 is discharged in the present embodiment, the electric cell 11 is charged. Therefore, the received power Pin is the sum of the load power PL and the charged power to the electric cell 11. As described above, the power leveling control is performed by limiting the cumulative electric energy Ein in the demand timing to the value equal to the leveling target value x.

Described below is the method of determining the leveling target value in the power leveling system 1 according to the first embodiment with the configuration above. In the above-mentioned power leveling control, the feedback control is performed by determining the leveling period and updating the subsequent leveling target value based on the past leveling period. Since the variable load 13 normally fluctuates depending on the activity people, for example, the period of a high power demand and the period of a low power demand alternately appear often in a day. Therefore, in the present embodiment, a period in which it is predicted that the period of a high power demand of the variable load 13 and the period of a low power demand alternately appear, for example, a day (24 hours) indicating a high demand in the daytime and a low demand in the night is defined as the leveling period T0. In another example of T0, a year indicating a high demand in summer and a low demand in winter may be defined as the leveling period T0. Then, it is preferable that the power leveling system 1 charges the electric cell 11 in the leveling period T0 to the upper limit of the use of the electric cell capacity, the lower limit of the use of the electric cell capacity is reached in the leveling period, and at the end of the leveling period, the same level of the electric cell residue at the initial stage of the leveling period is attained.

FIG. 4 is an explanatory view of an example of the power leveling control in the leveling period. In FIG. 4, the horizontal axis indicates time, the vertical axis indicates power, electric energy, and electric cell residue. FIG. 4 illustrates a variation example of the received power Pin, the cumulative electric energy Ein, the load power PL, and the electric cell residue Br in the leveling period T0. Furthermore, FIG. 4 illustrates an example of a leveling target value x, an electric cell residue initial value B0, an electric cell residue lower use limit Bl, and an electric cell residue upper use limit Bu.

Described below is the electric cell residue lower use limit Bl. In the power leveling system 1, it is necessary to resume the reception of power from the power supply 3 to avoid power failure before the capacity of the electric cell residue Br runs out. However, for example, when the control error of the leveling target value x occurs and the leveling target value x becomes unnecessarily low, the peak of high electric energy received may occur in the cumulative electric energy Ein. To avoid the occurrence of the peak of the cumulative electric energy Ein, the value for determination of the insufficiency of the electric cell residue Br is to be set so that the value includes the margin to absorb the control error with respect to "0" as illustrated in FIG. 4. The value is referred to as an electric cell residue lower use limit Bl, and is a value specified in advance or a value determined depending on the deficiency of the electric cell residue.

Thus, in the power leveling system 1, the target determination unit 22 has a set value of the electric cell residue lower use limit Bl, and judges that the electric cell residue is low when the minimum value of the electric cell residue in the previous leveling period becomes lower than the electric cell residue lower use limit Bl. Thus, the possibility that the electric cell residue Br is "0" is reduced, and the occurrence of a higher peak of the cumulative electric energy Ein may be avoided.

Described next is the electric cell residue upper use limit Bu. Since an electric cell is not a power supply, it is necessary to recover by charging the power discharged for leveling. If the electric cell maintains the full charge state, the charging operation is not performed although the opportunity to charge is acquired, and there may be the case in which the electric energy which may be discharged may be reduced. As a result, since the peak reduction capability is also degraded, it is necessary to judge the full charge state by the margin also for the upper limit as well as the electric cell residue lower use limit. The value used in the judgment is referred to as an electric cell residue upper use limit Bu which is specified in advance by the target determination unit 22. Generally for an electric cell, the upper limit of a charge voltage is determined, and with a decreasing difference between the charge voltage and the voltage of the electric cell when the full charge state is approached, the charge current also decreases, thereby reducing the charging speed. For example, when the electric cell residue Br≈85(%) holds true, the slope of the electric cell residue Br changes, and the charging speed is definitely reduced. The area of the electric cell capacity in which the charging speed is reduced is referred to as a constant voltage charge area.

When the electric cell capacity is used at the maximum including the constant voltage charge area, the power leveling system 1 has to suppress the electric energy to be discharged for leveling depending on the charging speed when the discharged power is regained in the leveling period. However, since the charging speed of the constant voltage charge area decreases exponentially, the dischargeable electric energy exceedingly decreases, and the peak reduction capability is similarly degraded. Therefore, in the power leveling system 1, the constant voltage charge area is not actively used, and it may be considered that the full charge state has been performed if the electric cell residue has reached the lower limit of the area. If the value of the electric cell residue Br which is used when the full charge state is regarded is set as the electric cell residue upper use limit Bu, it is preferable because the performance degradation due to maintenance of the full charge state and the degradation of the charging speed bay be avoided. The lower limit of the constant voltage charge area is generally indicated as the specification of the electric cell 11.

In FIG. 4, the electric cell residue Br is the electric cell residue initial value B0 at the starting time t=0 in the leveling period T0. Then, as a result of the power leveling control in the power leveling system 1, the electric cell residue Br becomes the maximum around the electric cell residue upper use limit Bu at time t=t5. In addition, it becomes the minimum around the electric cell residue lower use limit Bl at time t=t6, and the electric cell residue Br=B0 holds true again at the ending time t=T0 in the leveling period T0. The leveling target value x when the operation result is acquired is the ideal value capable of effectively using the electric cell energy of the electric cell 11 and minimizing the peak of the received electric energy in the demand timing.

In the above-mentioned power leveling system 1, the power leveling control in which the leveling target value x is determined based on the change of the electric cell residue Br in the leveling period T0 requires the following reference input elements. That is, the elements are an electric cell residue maximum value Bmax, an electric cell residue minimum value Bmin in the leveling period T0, a final electric cell residue B, and an electric cell residue balance Bd. The final electric cell residue B is the electric cell residue Br at the end of the leveling period, and the electric cell residue balance Bd is the difference between the electric cell residues Br at the start and the end of the leveling period.

FIG. 5 is an example of leveling control when the electric cell residue Br is judged to be insufficient. In FIG. 5, the horizontal axis indicates time, the vertical axis indicates power, electric energy, and electric cell residue. FIG. 5 illustrates an example of variations of the received power Pin, the cumulative electric energy Ein, the load power PL, and the electric cell residue Br in the leveling period T0. Furthermore, FIG. 5 illustrates an example of the leveling target value x, the electric cell residue initial value B0, the electric cell residue lower use limit Bl, and the electric cell residue upper use limit Bu.

In FIG. 5, the electric cell residue Br is the electric cell residue initial value B0 at the starting time t=0 of the leveling period T0. As a result of the power leveling control in the power leveling system 1, the electric cell residue Br becomes the electric cell residue maximum value Bmax around the electric cell residue upper use limit Bu in the area 5A. Furthermore, it becomes the electric cell residue minimum value Bmin around lower than the electric cell residue lower use limit Bl in the area 5B, and becomes the final electric cell residue B as illustrated in the area 5C again at the ending time t=T0 in the leveling period T0. In the example in FIG. 5, since the electric cell residue minimum value Bmin is lower than the electric cell residue lower use limit Bl, it is judged that the electric cell residue Br is insufficient.

Figure 6:
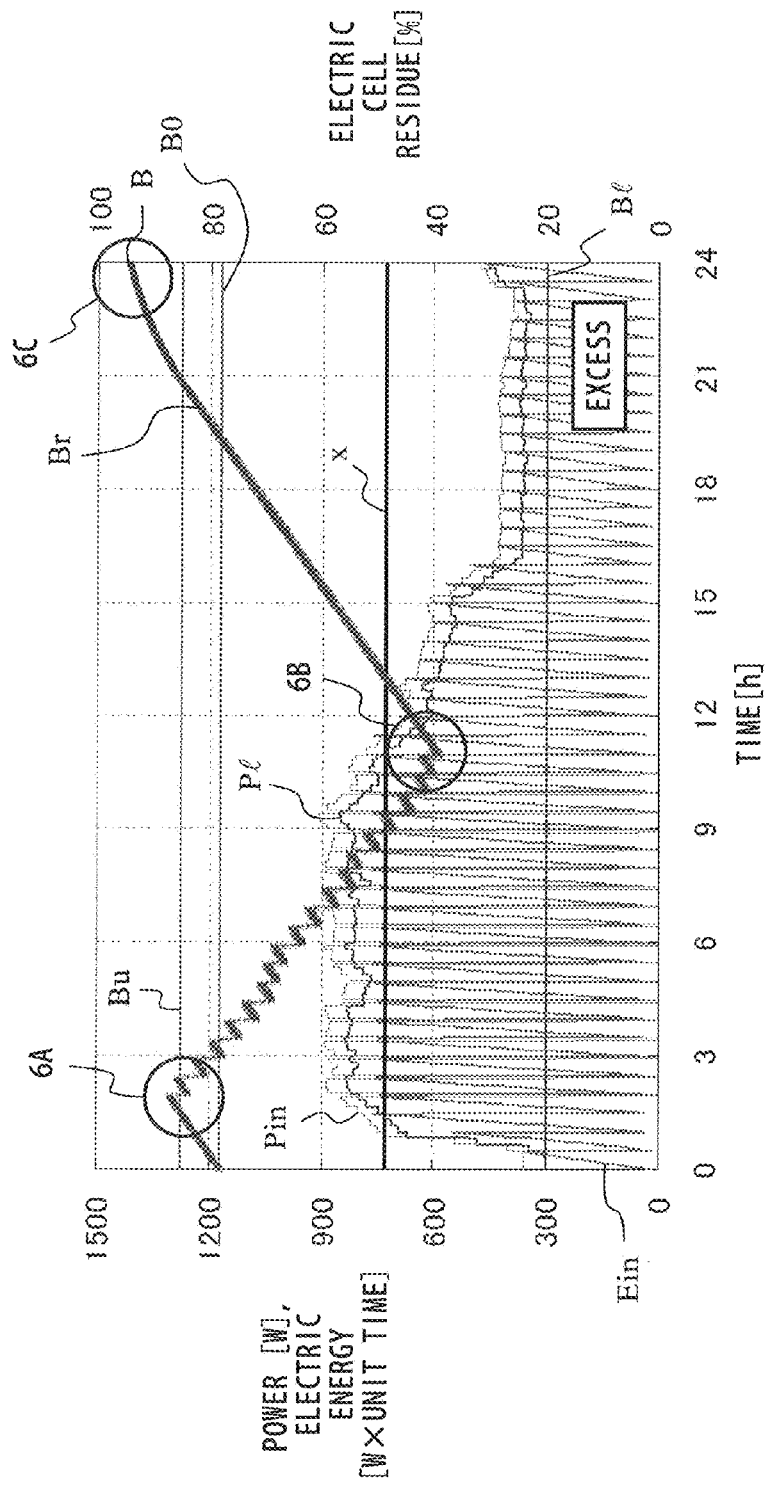
FIG. 6 is an example of the leveling control when the electric cell residue is excessive according to the first embodiment.

FIG. 6 is an example of the leveling control when the electric cell residue Br is judged to be excessive. In FIG. 6, the horizontal axis indicates time, and the vertical axis indicates power, electric energy, and electric cell residue. FIG. 6 illustrates an example of variations of the received power Pin, the cumulative electric energy Ein, the load power PL, and the electric cell residue Br in the leveling period T0. FIG. 6 also illustrates an example of the leveling target value x, the electric cell residue initial value B0, the electric cell residue lower use limit Bl, and the electric cell residue upper use limit Bu.

In FIG. 6, the electric cell residue Br is the electric cell residue initial value B0 at the starting time t=0 of the leveling period T0. As a result of performing the power leveling control in the power leveling system 1, the electric cell residue Br becomes the electric cell residue maximum value Bmax around the electric cell residue upper use limit Bu in the area 6A. Furthermore, it becomes the electric cell residue minimum value Bmin at the point over the electric cell residue lower use limit Bl in the area 6B, and again at the ending time t=T0 of the leveling period T0, it becomes the final electric cell residue B as illustrated in the area 6C. In the example in FIG. 5, since the electric cell residue minimum value Bmin exceeds the electric cell residue lower use limit Bl, it is judged that the electric cell residue Br is excessive.

Figure 7:
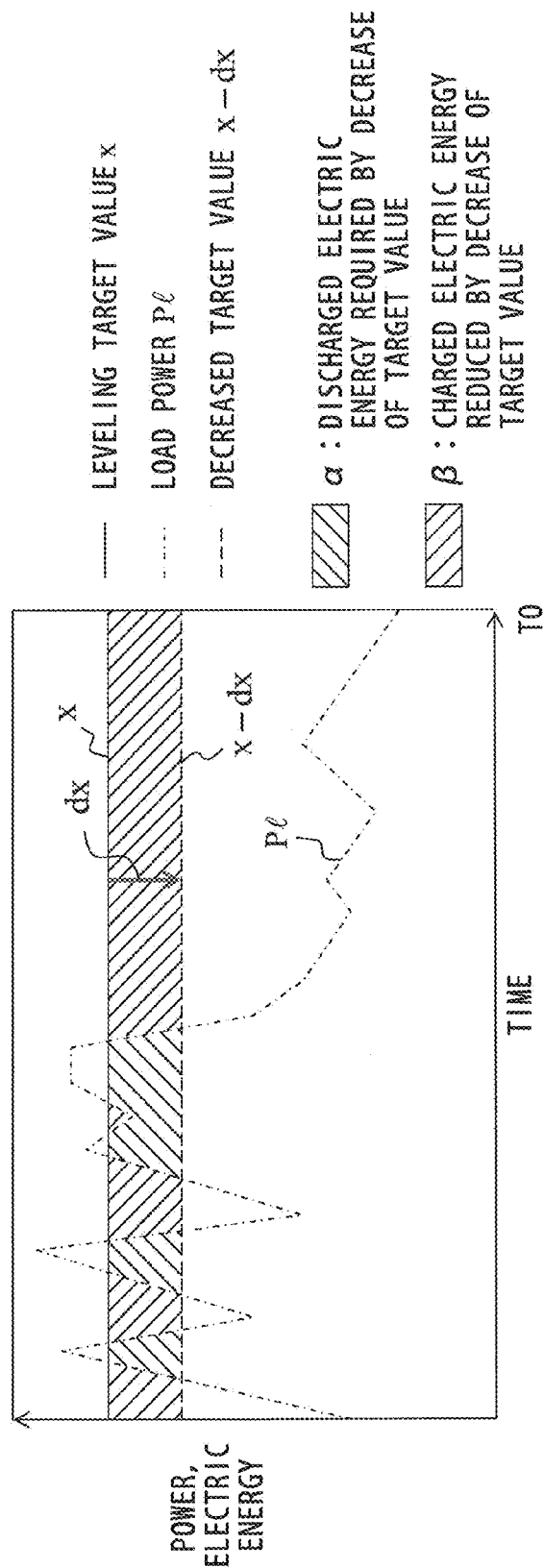
FIG. 7 is a schematic diagram of a variation determining method when the leveling target value according to the first embodiment is reduced.

FIG. 7 is a schematic diagram of a decrement determining method when the leveling target value x is reduced in the power leveling system 1 according to the first embodiment. In FIG. 7, the horizontal axis indicates time and the vertical axis indicates power and electric energy, and FIG. 7 illustrates the fluctuation of the load power Pl in the leveling period T0 with the lapse of time. Assume that the leveling target value x in the leveling period T0 is reduced by the variation dx.

The electric energy expressed in the area α is a discharged energy from the electric cell required by decreasing the leveling target value x by the variation dx, and the electric energy expressed in the area β is the charged energy to the electric cell decreasing by reducing the leveling target value x by the variation dx. In this case, the electric energy as a sum of the area α and the area β corresponds to the excess of the electric cell residue Br which decreases by reducing the leveling target value x by the variation dx. The variation dx is determined so that the excess of the electric cell residue Br may corresponds to the product of the variation dx and the leveling period T0.

The description above holds true with the case in which the electric cell residue Br is insufficient. That is, the target determination unit 22 determines the variation dx so that the sum of the charged energy which becomes unnecessary and the charged energy which becomes necessary by increasing the leveling target value x by the variation dx corresponds to the deficiency of the electric cell residue Br which increases by increasing the leveling target value x by the variation dx.

Figure 8:
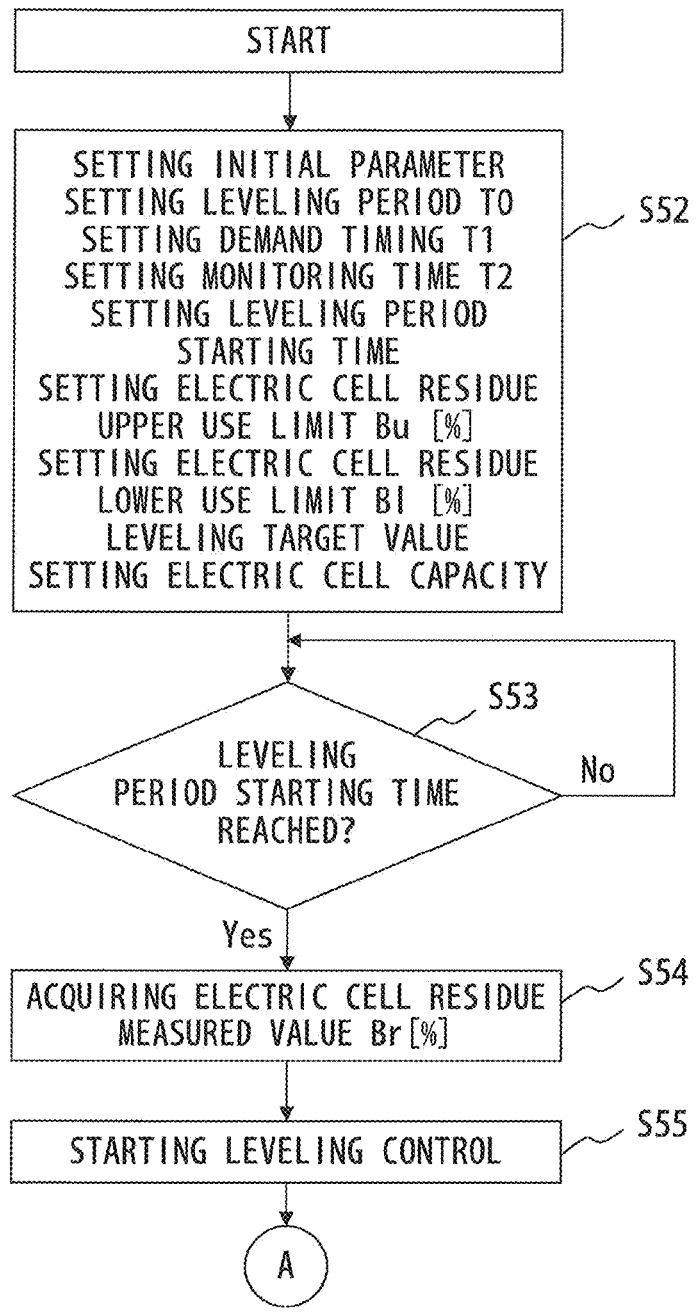
FIG. 8 is a flowchart of the operation of the power leveling system according to the first embodiment.
Figure 9:
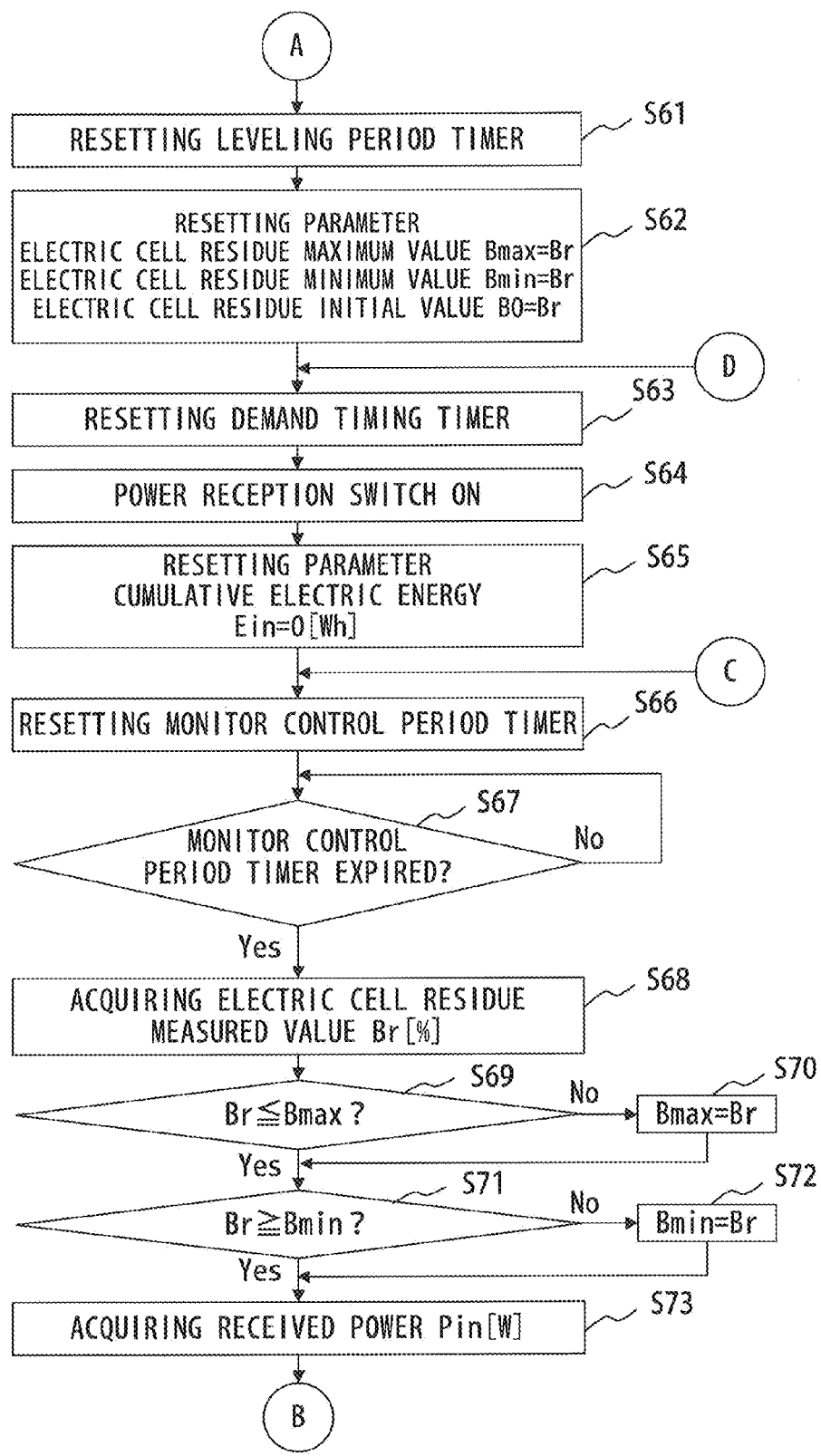
FIG. 9 is a flowchart of the operation of the power leveling system according to the first embodiment.
Figure 10:
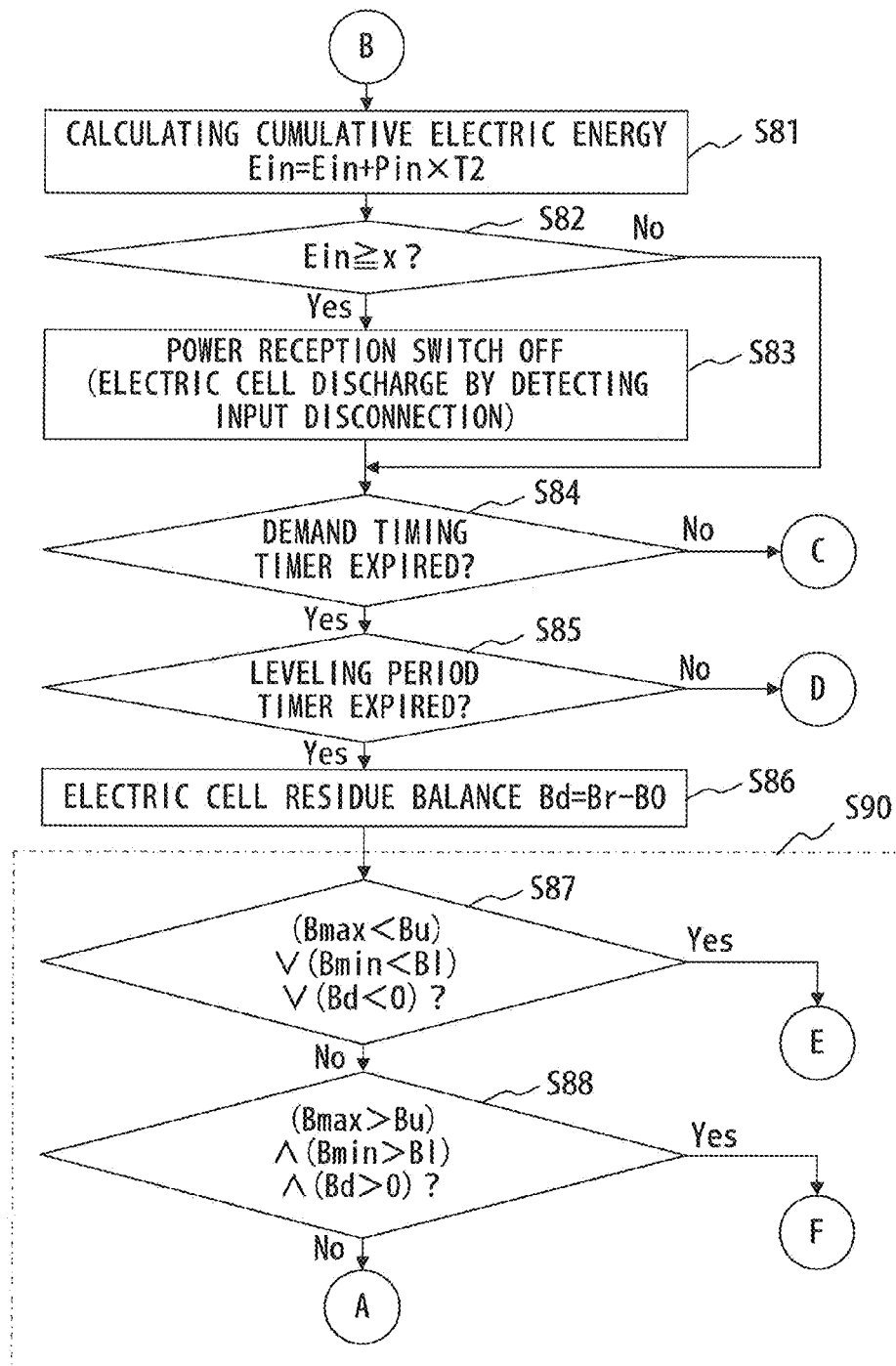
FIG. 10 is a flowchart of the operation of the power leveling system according to the first embodiment.

The operation of the power leveling system 1 according to the first embodiment is described below with reference to FIGS. 8 through 15. FIGS. 8 and 9 are flowcharts of the operation of the power leveling system 1 according to the first embodiment. FIG. 10 is an explanatory view of the state in which the electric cell residue runs out.

As illustrated in FIG. 8, the target determination unit 22 sets an initial parameter for power leveling control in advance. That is, the leveling period T0, the demand timing T1, the monitoring time T2, and leveling period starting time are set, and stored in the storage unit 24. Furthermore, the electric cell residue upper use limit Bu (%), the electric cell residue lower use limit Bl (%), the initial value x=x0 (Wh) of the leveling target value and the electric cell capacity Bc (Wh) for leveling target value determination control are set and stored in the storage unit 24 (S52).

The target determination unit 22 monitors whether or not the leveling period starting time set in S52 has come by comparing the leveling period starting time stored in the storage unit 24 and acquired present time by the time acquisition unit not illustrated in the attached drawings and (NO in S53). If the leveling period starting time has come (YES in S53), the target determination unit 22 first acquires the electric cell residue B (%) as an initial value of the electric cell residue Br (S54), and starts the leveling control (S55).

In the process illustrated in FIG. 9, the target determination unit 22 resets the leveling period timer (not illustrated in the attached drawings) (S61). Furthermore, the target determination unit 22 resets the electric cell residue maximum value Bmax to Br, the electric cell residue minimum value Bmin to Br (%), and the electric cell residue initial value B0 to Br (S62), and resets the demand timing timer (not illustrated in the attached drawings) (S63). The target determination unit 22 outputs an operation signal for allowing the switch control unit 26 to close the switch 5 and start the reception of power, and the switch 5 closes the connection according to the indication signal from the switch control unit 26. In this case, the electric cell 11 detects a normal input and starts or continues the charge of the own electric cell 11 and the supply of power from the power supply 3 to a load (S64). The target determination unit 22 resets the cumulative electric energy Ein to 0 (Wh) (S65), and resets the monitor control period timer (not illustrated in the attached drawings) (S66).

The target determination unit 22 continues monitoring until the expiration of the monitor control period timer (NO in S67). If the timer expires (YES in S67), the target determination unit 22 acquires the electric cell residue Br measured by the electric cell residue measurement unit 12 (S68). The target determination unit 22 compares the acquired electric cell residue Br with the electric cell residue maximum value Bmax. When the electric cell residue Br is not more than the electric cell residue maximum value Bmax, control is passed to step S71 (YES in S69). If the electric cell residue Br is larger than the electric cell residue maximum value Bmax (NO in S69), then the target determination unit 22 updates the electric cell residue maximum value Bmax to the electric cell residue Br (S70), stores the result in the storage unit 24, and control is passed to step S71. The target determination unit 22 compares the acquired electric cell residue Br with the electric cell residue minimum value Bmin. If the electric cell residue Br is not less than the electric cell residue minimum value Bmin, control is passed to step S73 (YES in S71). If the electric cell residue Br is smaller than the electric cell residue minimum value Bmin (NO in S71), the target determination unit 22 updates the electric cell residue minimum value Bmin to the electric cell residue Br (S72), stores the result in the storage unit 24 and control is passed to step S73. The target determination unit 22 acquires the received power Pin (W) by the received power measurement unit 9 (S73).

In the process illustrated in FIG. 10, the target determination unit 22 calculates the cumulative electric energy Ein=Ein+Pin×T2, and stores the result in the storage unit 24 (S81). The switch control unit 26 compares the cumulative electric energy Ein calculated in S81 with the current leveling target value x. If the cumulative electric energy Ein is lower than the leveling target value x (NO in S82), control is passed to step S84. If the cumulative electric energy Ein calculated in S81 is not less than the leveling target value x (YES in S82), then the switch control unit 26 outputs to the switch 5 an operation signal for disconnection, and the switch 5 disconnects the connection. In this case, the electric cell 11 detects the disconnection of an input, and starts or continues the power supply to the load by the discharge (S83).

When the target determination unit 22 judges that the demand timing timer has not expired yet (NO in S84), the processes in S66 through S84 are repeated. When the target determination unit 22 judges that the demand timing timer has expired (YES in S84), it judges whether or not the leveling period timer has expired (S85). If the target determination unit 22 judges that the leveling period timer has not expired yet (NO in S85), then the processes in S63 through S85 are repeated. If the target determination unit 22 judges that the leveling period timer has expired (YES in S85), it calculates the electric cell residue balance Bd=Br−B0 (S86), and control is passed to the process (S90) of determining the leveling target value x. In this case, the current electric cell residue Br may be stored as the final electric cell residue B in the storage unit 24.

In S90, the target determination unit 22 judges whether or not the condition of the electric cell residue maximum value Bmax<electric cell residue upper use limit Bu, or the electric cell residue minimum value Bmin<electric cell residue lower use limit Bl, or the electric cell residue balance Bd<0 holds true (S87). If the result of the judgment satisfies the condition, then the target determination unit 22 judges that the leveling target value x is to increase, and passes control to the process in FIG. 11. If the condition is not satisfied, control is passed to step S88.

The target determination unit 22 judges whether or not the conditions of the electric cell residue maximum value Bmax>electric cell residue upper use limit Bu, and the electric cell residue minimum value Bmin>electric cell residue lower use limit Bl, and the electric cell residue balance Bd>0 hold true (S88). If the result of the judgment satisfies the conditions (YES in S88), the target determination unit 22 judges that the leveling target value x is to decrease, and passes control to the process in FIG. 13. If the result of the judgment does not satisfy the condition, the target determination unit 22 does not change the leveling target value x, and control is returned to the process in FIG. 8.

In the processes above, the target determination unit 22 performs the judging process etc. by storing in or reading from the storage unit 24 the electric cell residue maximum value Bmax, the electric cell residue minimum value Bmin, the electric cell residue initial value B0, etc.

Described below is the judgment as to increase or decrease the leveling target value x. In the present embodiment, the description is given above with reference to S87 in FIG. 10 as an increase condition and S88 as a decrease condition, but the present embodiment is not limited to these conditions. The condition relating to the above-mentioned reference input elements is defined as follows depending on whether the leveling target value x is to increase or decrease in the next leveling period T0.

Decrease Condition) when the Leveling Target Value x is Decreased:

Condition 1a) electric cell residue maximum value Bmax>electric cell residue upper use limit Bu Condition 1b) electric cell residue minimum value Bmin>electric cell residue lower use limit Bl Condition 1c) electric cell residue balance Bd>0

Condition 1d) final electric cell residue B>electric cell residue upper use limit Bu Increase Condition) when the Leveling Target Value x is Increased:

Condition 2a) electric cell residue maximum value Bmax<electric cell residue upper use limit Bu Condition 2b) electric cell residue minimum value Bmin<electric cell residue lower use limit Bl Condition 2c) electric cell residue balance Bd<0

Condition 2d) final electric cell residue B<electric cell residue upper use limit Bu At least one condition each from the above-mentioned 4 decrease and 4 increase conditions is selected. When a plurality of conditions are selected, a logical sum or a logical product is acquired from them. In the present variation example, for example when there is no sufficient room in the electric cell capacity, the increase condition for increase of the leveling target value x is prioritized to avoid a power failure, and a logical product is acquired for the decrease condition, and the logical sum is acquired for the increase condition. With the application, 15 conditions are obtained as the decrease condition, and 15 conditions are obtained as the increase condition. Furthermore, assume the case in which it is first judged whether or not the decrease condition holds true, that is, whether or not the decrease condition for the leveling target value x holds true, and the case in which it is first judged whether or not the increase condition holds true. Then, 450 conditions, that is, 15×15×2=450, are obtained. These conditions are all applicable in the power leveling system 1, and are included in the first embodiment.

For example, the conditions explained with reference to FIG. 10 are expressed as follows.

Decrease condition): Condition 1a, and condition 1b, and condition 1c (logical product)

Increase condition): Condition 2a, or condition 2b, or condition 2c (logical sum)

Figure 11:
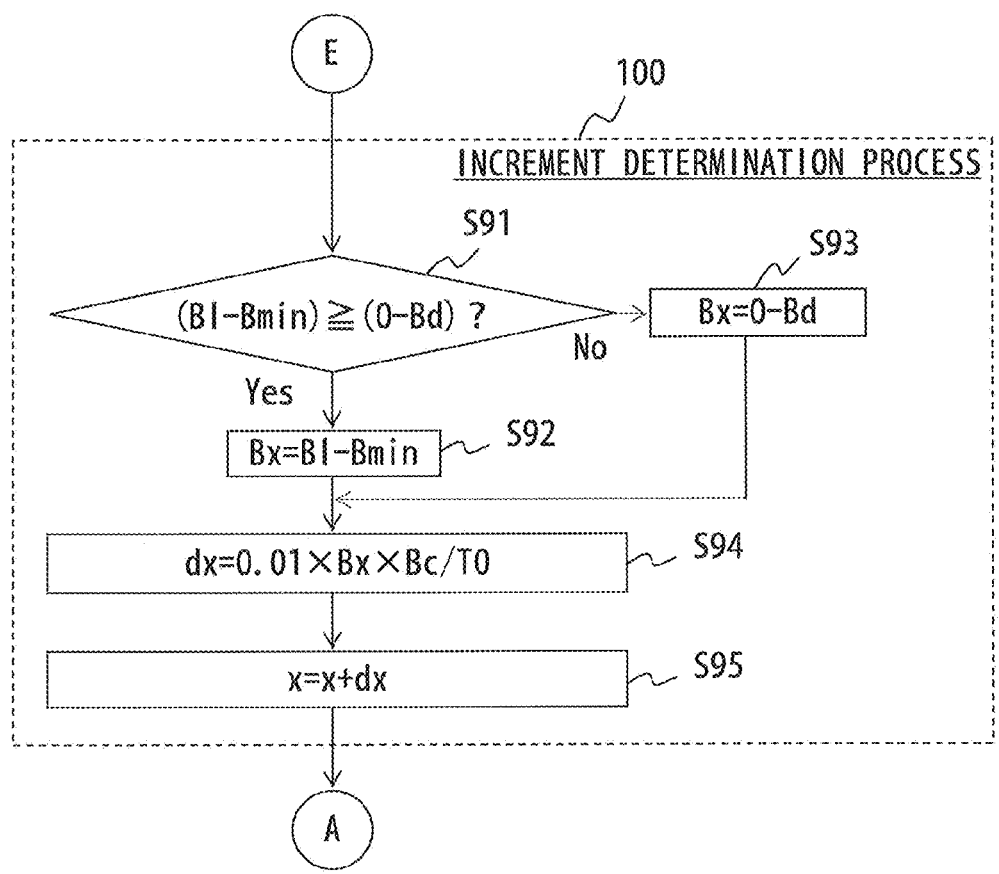
FIG. 11 is a flowchart of the increment determining process of the leveling target value according to the first embodiment.
Figure 13:
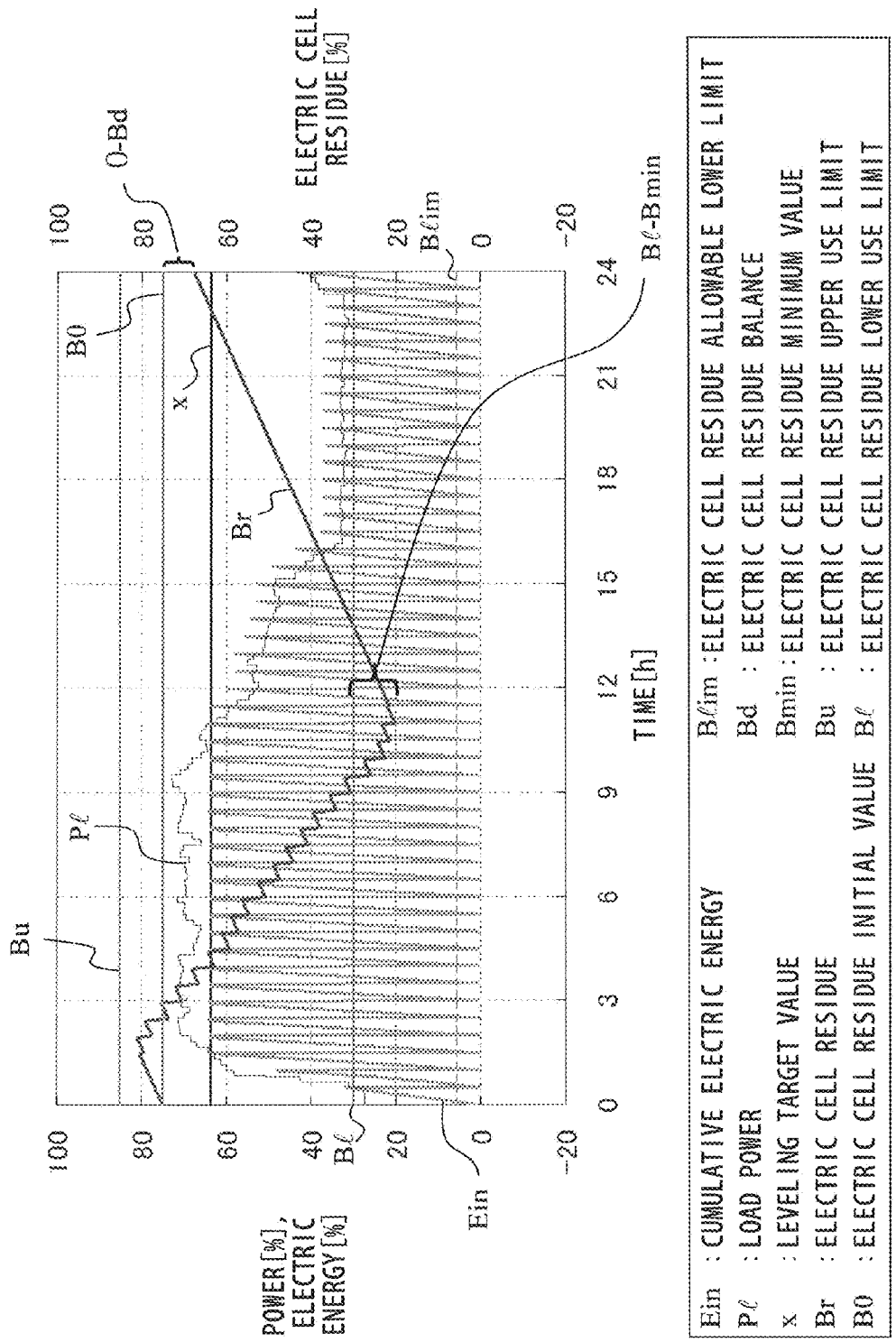
FIG. 13 is an explanatory view of the increment determining process of the leveling target value according to the first embodiment.

Next, the increment determining process of the leveling target value x is explained with reference to FIGS. 11 through 13. FIG. 11 is a flowchart of the increment determining process of the leveling target value x. FIG. 13 is an explanatory view of the increment determining process of the leveling target value x. As illustrated in FIG. 11, the target determination unit 22 in the increment determining process 100 judges whether or not the following expression holds true (S91).

electric cell residue lower use limit $Bl$–electric cell residue minimum value $Bmin \geq 0$–electric cell residue balance $Bd$ In FIG. 12, the horizontal axis indicates time, and the vertical axis indicates power, electric energy, and electric cell residue. FIG. 12 illustrates an example of variations of the received power Pin, the cumulative electric energy Ein, the load power PL, and the electric cell residue Br in the leveling period T0, and also illustrates the electric cell residue allowable lower limit Blim. In this application, the electric cell residue Br is regarded.

The electric cell residue allowable lower limit Blim is explained. When the electric cell residue Br accumulated by charging when the charging and the discharging operations are repeated is smaller than the discharged power, for example, although the electric cell residue Br is not zero ({fourth root}0) at a monitoring time during the discharging operation, it may be considered that the electric cell residue Br becomes zero (=0) at a time before the next monitor time. That is, since the monitoring time T2 is finite, the electric cell residue may be used up before the next monitoring time, the power supply to the variable load 13 stops, and a load stop may occur although the existence of the electric cell residue Br may be measured at a monitoring time. Therefore, when the variable load 13 is a load which is not allowed to make an accidental stop like a computer, it is necessary to perform control to monitor the electric cell residue Br, and perform switching control to receive power from the power supply 3 by closing the switch 5 before the electric cell residue runs out.

Therefore, the lower limit of the electric cell residue Br for judgment of "no electric cell residue" is not "0", but is to be the value with a residue taken into account for the demand until the next monitoring time. The value is referred to as an electric cell residue allowable lower limit Blim. The electric cell residue allowable lower limit Blim is determined as a value of the electric cell residue Br for a product of the monitoring time T2 and the maximum dischargeable power Pmax or the maximum power of the variable load 13, and a margin δ may be added for guarantee. The electric cell residue allowable lower limit Blim is expressed by, for example the equation 1 below.

$$Blim = 100 \times Pmax(W) \times T2(h)/Bc(Wh) + \delta(\%) \quad \text{(equation 1)}$$

Bc indicates an electric cell capacity. Thus, in the area 12A in FIG. 12, the electric cell residue Br is not more than electric cell residue allowable lower limit Blim, and there is no electric cell residue Br actually.

Normally, a setting is made to charge the electric cell 11 to avoid a power failure when the electric cell residue Br is lower than the electric cell residue lower use limit Bl. However, if the electric cell residue Br is sufficient, it changes as the expanded electric cell residue Br' illustrated in FIG. 12, and is to become the expanded minimum electric cell residue Bl. Therefore, when the variation dx of the leveling target value x is calculated, the value of the electric cell residue Br is not used as is, but it is to be considered that the electric cell residue Br has changed based on the expanded electric cell residue Br'. The expanded electric cell residue Br' is calculated by, for example, subtracting the received electric energy in the period in which the switch 5 is closed for avoiding a power failure from the electric cell residue Br.

In FIG. 13, the horizontal axis indicates time, and the vertical axis indicates the power, the electric energy, and the electric cell residue. FIG. 13 illustrates an example of variations of the received power Pin, the cumulative electric energy Ein, the load power Pl, and the electric cell residue Br. In this example, the electric cell residue Br is regarded.

FIG. 13 illustrates the minimum value deficiency=Bl−Bmin and the electric cell residue balance deficiency=0−Bd in the judgment in S91 in FIG. 11. In the present embodiment, the target determination unit 22 calculates the minimum value deficiency and the balance deficiency with reference to the electric cell residue Br stored in the storage unit 24, and judges as the change reference Bx whichever is larger between them as a deficiency of the electric cell residue Br.

That is, back to FIG. 11, the target determination unit 22 defines the change reference Bx of the electric cell residue Br as Bl−Bmin (S92) when the minimum value deficiency=Bl−Bmin is not less than the balance deficiency=0−Bd (YES in S91). When the minimum value deficiency=Bl−Bmin is less than the balance deficiency=0−Bd (NO in S91), the target determination unit 22 defines the change reference Bx of the electric cell residue Br as 0−Bd (S93).

Thus, the target determination unit 22 judges as the change reference Bx for changing the leveling target value x whichever is larger between the minimum value deficiency and the balance deficiency as a deficiency of the electric cell residue Br.

Depending on the selection of the leveling target value increase condition in S87 and the judgment condition of the change reference Bx at the increase, the Bx may be negative. In this case, it is preferable that Bx is set to 0 (Bx=0).

In this case, the variation of the leveling target value x is expressed by the equation 2 below.

leveling target increment value (variation $dx$) ($Wh$)=0.01×deficiency (%) of electric cell residue $Br$ which decreases by the increase of target value (the change reference $Bx$)×electric cell capacity $Bc(Wh)$/leveling period $T0(h)$ (equation 2)

That is, the target determination unit 22 sets the variation dx as 0.01×Bx×Bc/T0 (S94), replaces the leveling target value as x=x+dx, and returns control to the process in FIG. 8 (S95).

Figure 14:
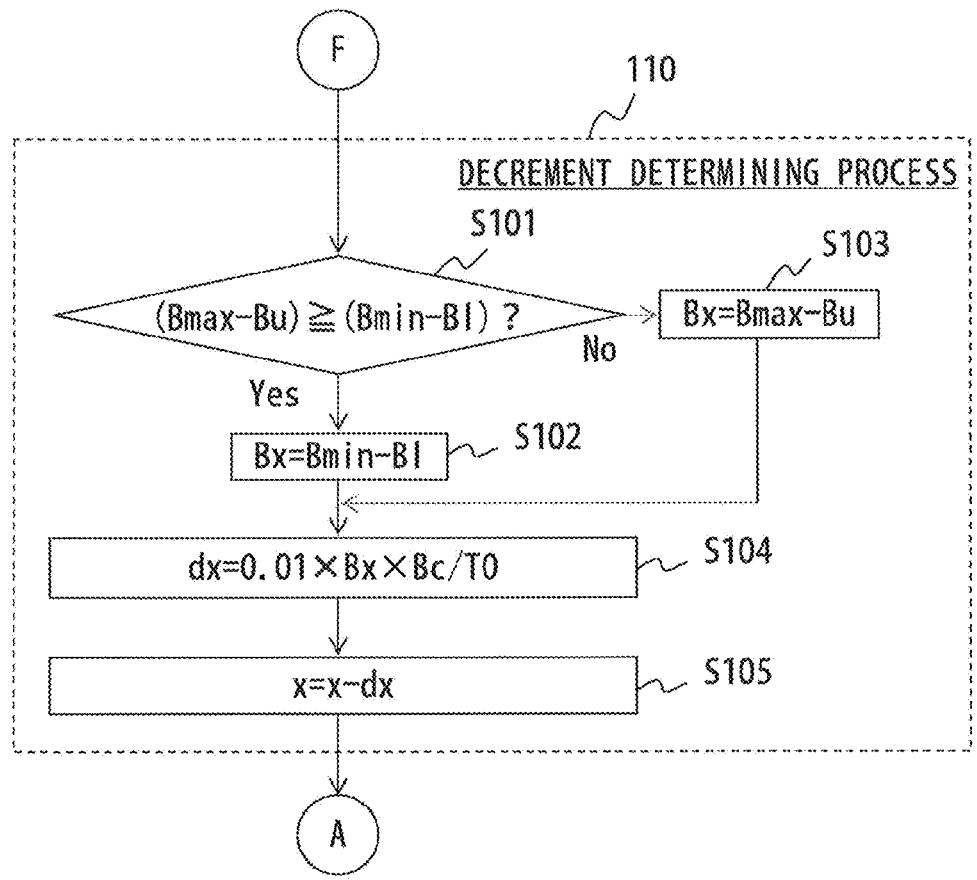
FIG. 14 is a flowchart of the decrement determining process of the leveling target value according to the first embodiment.
Figure 15:
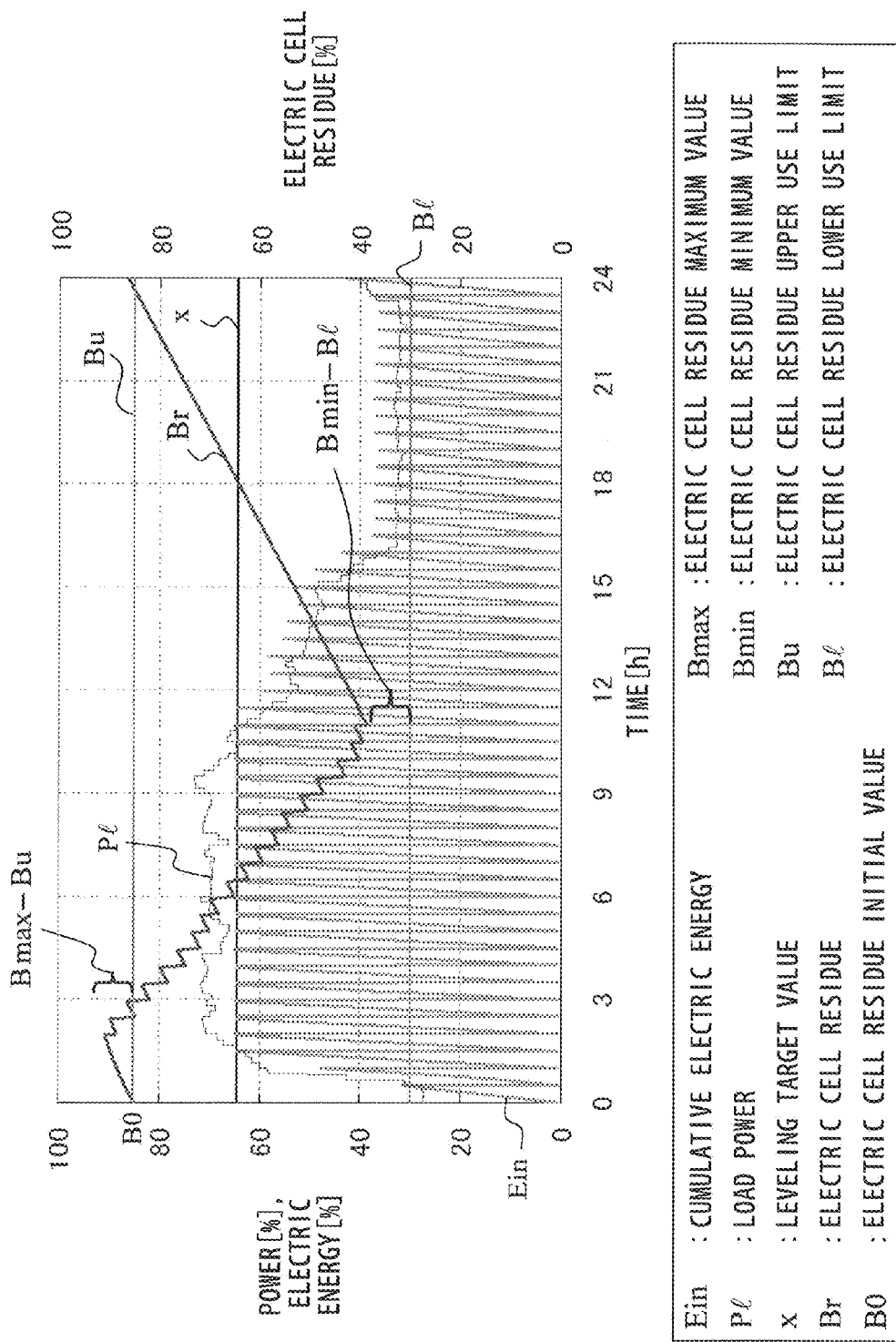
FIG. 15 is an explanatory view of the decrement determining process of the leveling target value according to the first embodiment.

Next, the decrement determining process of the leveling target value x is described below with reference to FIGS. 14 and 15. FIG. 14 is a flowchart of the process of determining the decrement of the leveling target value x. FIG. 15 is an explanatory view of the process of determining the decrement of the leveling target value x. As illustrated in FIG. 14, in the decrement determining process 110, the target determination unit 22 judges whether or not "electric cell residue maximum value Bmax−electric cell residue upper use limit Bu≥electric cell residue minimum value Bmin−electric cell residue lower use limit Bl" holds true (S101).

In FIG. 15, the horizontal axis indicates time, the vertical axis indicates the power, the electric energy, and the electric cell residue. FIG. 15 illustrates an example of variations of the received power Pin, the cumulative electric energy Ein, the load power Pl, and the electric cell residue Br in the leveling period T0. In this example, the electric cell residue Br is regarded. FIG. 15 illustrates the residue excess=Bmax−Bu and the minimum value surplus=Bmin−Bl in the judgment in S101 in FIG. 14. The target determination unit 22 refers to the electric cell residue Br stored in the storage unit 24, and judges as the change reference Bx for changing the leveling target value x whichever is smaller between the residue excess and the minimum value surplus as an excess of the electric cell residue Br.

That is, back to FIG. 14, the target determination unit 22 passes control to S102 when the residue excess=electric cell residue maximum value Bmax−electric cell residue upper use limit Bu is not less than the minimum value surplus=electric cell residue minimum value Bmin−electric cell residue lower use limit Bl (YES in S101). In S102, the change reference Bx=Bmin−Bl holds true. The target determination unit 22 sets the change reference Bx=Bmax−Bu (S103) when the residue excess=electric cell residue maximum value Bmax−electric cell residue upper use limit Bu is smaller than the minimum value surplus=electric cell residue minimum value Bmin−electric cell residue lower use limit Bl (NO in S101). Depending on the selection of the leveling target value decrease condition in S88 and the judgment condition of the Bx at the decrease, Bx may be negative, but it is preferable to set Bx=0.

The variation of the leveling target value is expressed by the following equation 3.

leveling target value (variation $dx$)($Wh$)=0.01×excess (%) of electric cell residue $Br$ which decreases by the decrease of target value (the change reference $Bx$)×electric cell capacity $Bc(Wh)$/leveling period $T0(h)$ (equation 3)

That is, the target determination unit 22 sets the variation dx as 0.01×Bx×Bc/T0 (S104), replaces the leveling target value x=x−dx, and returns control to the process in FIG. 8 (S105).

As described above, according to the power leveling system 1 of the first embodiment, the variation dx of the leveling target value x in the next leveling period T0 is calculated based on at least one of the electric cell residue maximum value Bmax in the leveling period T0 the electric cell residue minimum value Bmin, and the electric cell residue balance Bd, thereby changing the leveling target value x in the next leveling period T0.

That is, when the increasing operation is performed, the target determination unit 22 increases the leveling target value x based on whichever is larger between the minimum value deficiency=Bl−Bmin and the balance deficiency=0−Bd. When the decreasing operation is performed, the target determination unit 22 decreases the leveling target value x based on whichever is smaller between the residue excess=Bmax−Bu and the minimum value surplus=Bmin−Bl.

Thus, the leveling target value x is changed so that the sum of the charged energy and the discharged energy of the electric cell 11 which change by changing the leveling target value x may be equal to the electric energy which changes by changing the leveling target value x. Thus, the power leveling system 1 may perform the leveling control appropriate for the status of the variable load 13.

In this case, since the variation dx depends on the excess-deficiency level of the electric cell residue Br, the leveling target value x appropriate for the situation of the power supply 3 and the variable load 13 may easily obtained in the next leveling period T0. Therefore, the peak of the received power Pin may be reduced, and the rise of the received power due to the residue deficiency of the electric cell 11 and the failure to reserve the necessary electric cell residue Br by the end of the leveling period T0 may be avoided. Therefore, the degradation of the leveling effect by the residue excess or deficiency of the electric cell 11 may be prevented, thereby realizing the power leveling system 1 as a system of a high leveling effect.

The electric cell residue maximum value Bmax and the electric cell residue minimum value Bmin in the leveling period T0 may be updated each time the electric cell residue Br is acquired so that it is not necessary to include a storage unit having a large storage capacity to store all electric cell residue Br in the power leveling system.

Variation Example of the First Embodiment

Next, a variation example of the power leveling system 1 according to the first embodiment is described below with reference to FIGS. 16 through 18. In the variation example, the configuration and operation similar to those according to the first embodiment are assigned the same reference numerals and the overlapping explanation is avoided. The present variation example is related to a method for determining the variation dx of the leveling target value x according to the first embodiment. Therefore, the configuration of the power leveling system 1 and the processes in FIGS. 8 through 11 until the judgment of the increment or decrement of the leveling target value x are the same as in the present embodiment.

First, the increment determining process according to the present variation example is described below with reference to FIGS. 16 through 18. FIG. 16 is a flowchart illustrating an increment determining process. As illustrated in FIG. 16, the target determination unit 22 determines the change reference Bx by the following equation 4 (S111).

$$Bx=\max(\min(\max(100-B\max,Bl),Bl-B\min),-Bd) \quad \text{(equation 4)}$$

In this case, the function f (a, b)=max (a, b) outputs whichever is larger between the variables a and b, and the function g (a, b)=min (a, b) outputs whichever is smaller than the variables a and b.

That is, the change reference Bx is determined by the following logics.
(1) When the equation of (electric cell residue decrement: −Bd)≥(deficiency of the electric cell residue minimum value below the electric cell lower use limit: Bl−Bmin) holds true, the equation Bx=−Bd is set. It is to compensate for the residue deficiency of the electric cell residue Br at the termination point corresponding to the starting point of the leveling period T0.
(2) When (1) does not hold true, Bx=Bl−Bmin is set if (deficiency of the electric cell residue minimum value below the electric cell residue lower use limit: Bl−Bmin)≤(residue lower use limit: Bl). It is to compensate for the deficiency of the electric cell residue minimum value Bmin below the electric cell residue lower use limit Bl.
(3) In the case other than (1) and (2) above, Bx=Bl−Bmin is set if (deficiency of the electric cell residue minimum value below the electric cell residue lower use limit: Bl−Bmin) ≤difference between the electric cell capacity Bc and the electric cell residue maximum value: 100−Bmax). In this case, since the electric cell residue minimum value Bmin is a negative value, the surplus if any when the electric cell residue maximum value Bmax is low and the surplus for charge remains may be compensation.

Figure 17:
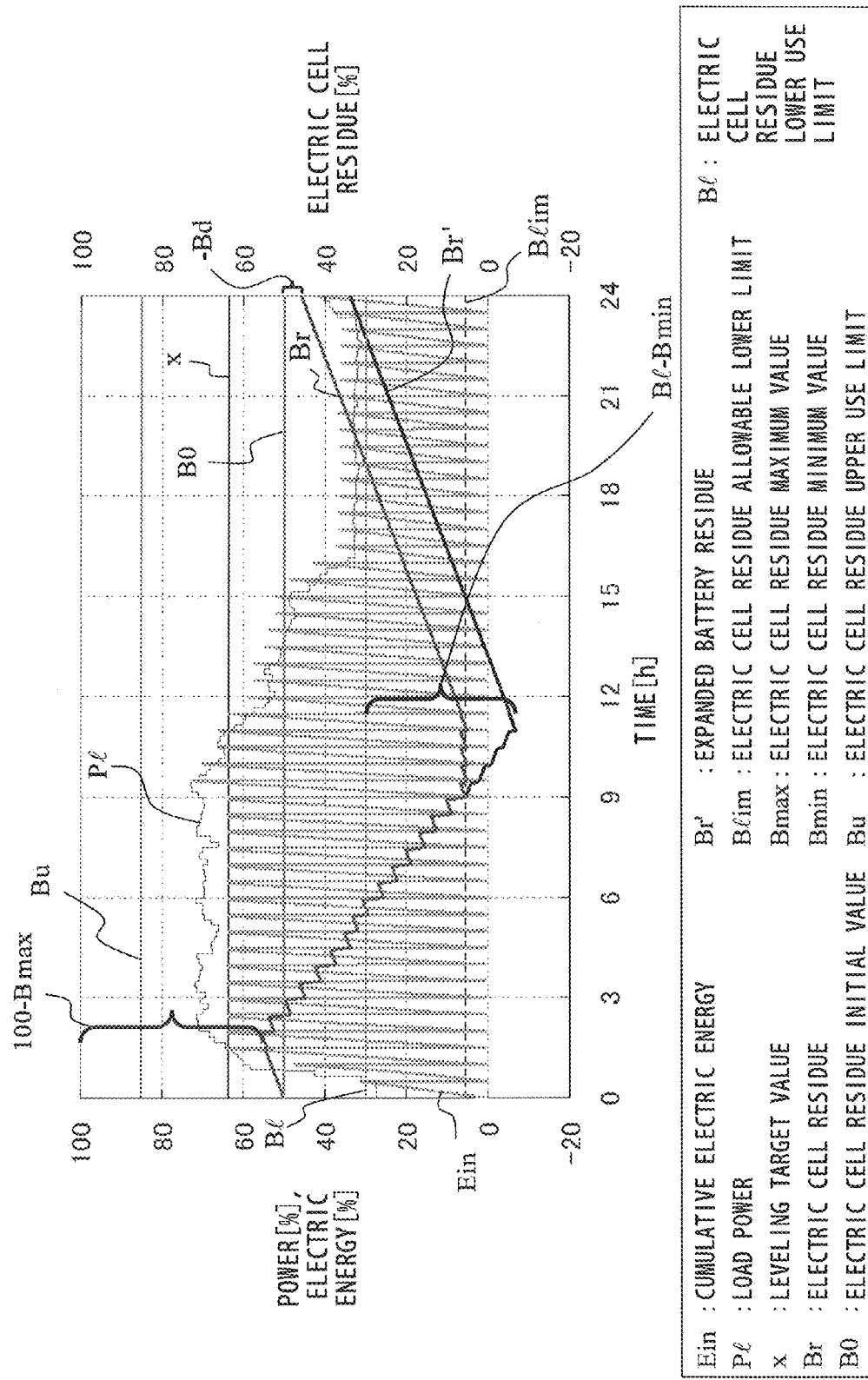
FIG. 17 is an explanatory view of the increment determining process of the leveling target value according to a variation example of the first embodiment.

FIG. 17 is an explanatory view of (3) above in the process of determining the increment of the leveling target value x. In FIG. 17, the horizontal axis indicates time, and the vertical axis indicates the power, the electric energy, and the electric cell residue. FIG. 17 is an example of variations of the received power Pin, the cumulative electric energy Ein, the load power Pl, and the electric cell residue Br in the leveling period T0. In this case, the electric cell residue Br is regarded.

Figure 16:
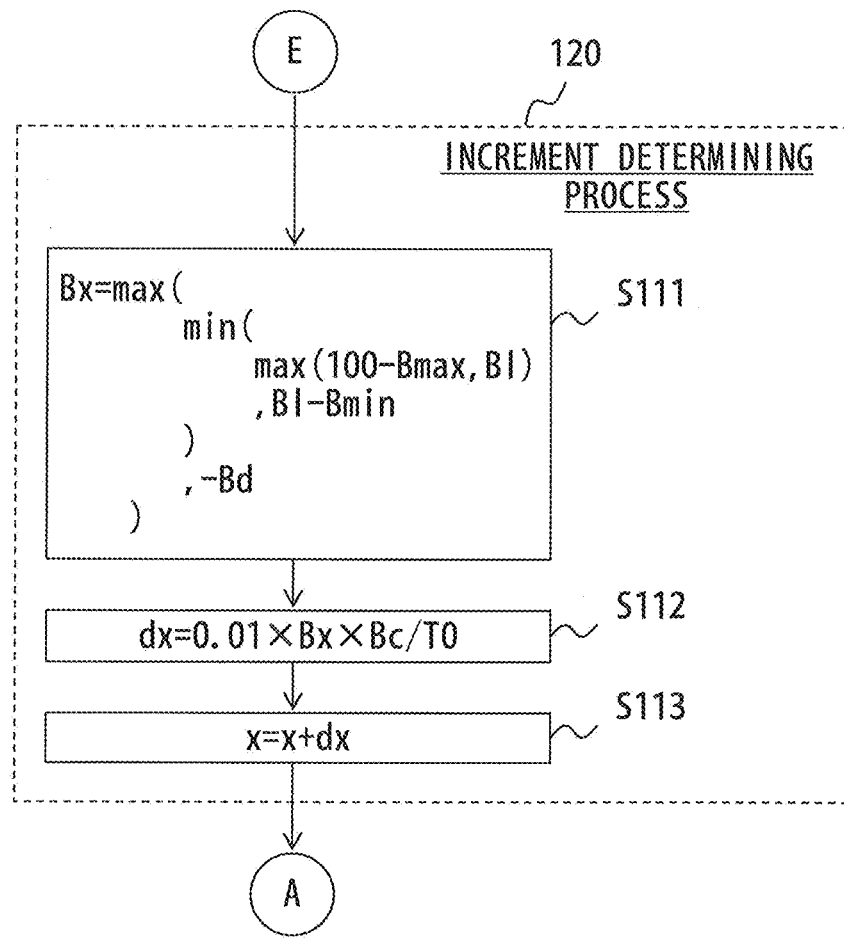
FIG. 16 is a flowchart of the increment determining process according to a variation example of the first embodiment.

FIG. 17 indicates the minimum value deficiency=Bl−Bmin, the balance deficiency=0−Bd, and the difference=100−Bmax between the electric cell capacity and the electric cell residue maximum value in the judgment in Sill in FIG. 16. The target determination unit 22 performs the calculation of these values with reference to the electric cell residue Br stored in the storage unit 24 at the end of the leveling period T0, and sets the change reference Bx=Bl−Bmin because the capacity Bc of the electric cell 11 is sufficient when the difference between the electric cell capacity Bc and the electric cell residue maximum value is larger than the minimum value deficiency=Bl−Bmin. In this case, as the electric cell residue minimum value Bmin, the minimum value of the expanded electric cell residue Br' described above with reference to FIG. 12 is used,
(4) In the case other than (1) through (3), defined as the change reference Bx is the value whichever is the largest among (electric cell residue decrement: −Bd), (difference between the electric cell capacity Bc and the electric cell residue maximum value: 100−Bmin), and (electric cell residue lower use limit: Bl). If the deficiency of the electric cell residue minimum value Bmin below the lower use limit is not compensated for as is, the largest value among the values above determines the deficiency.

Figure 18:
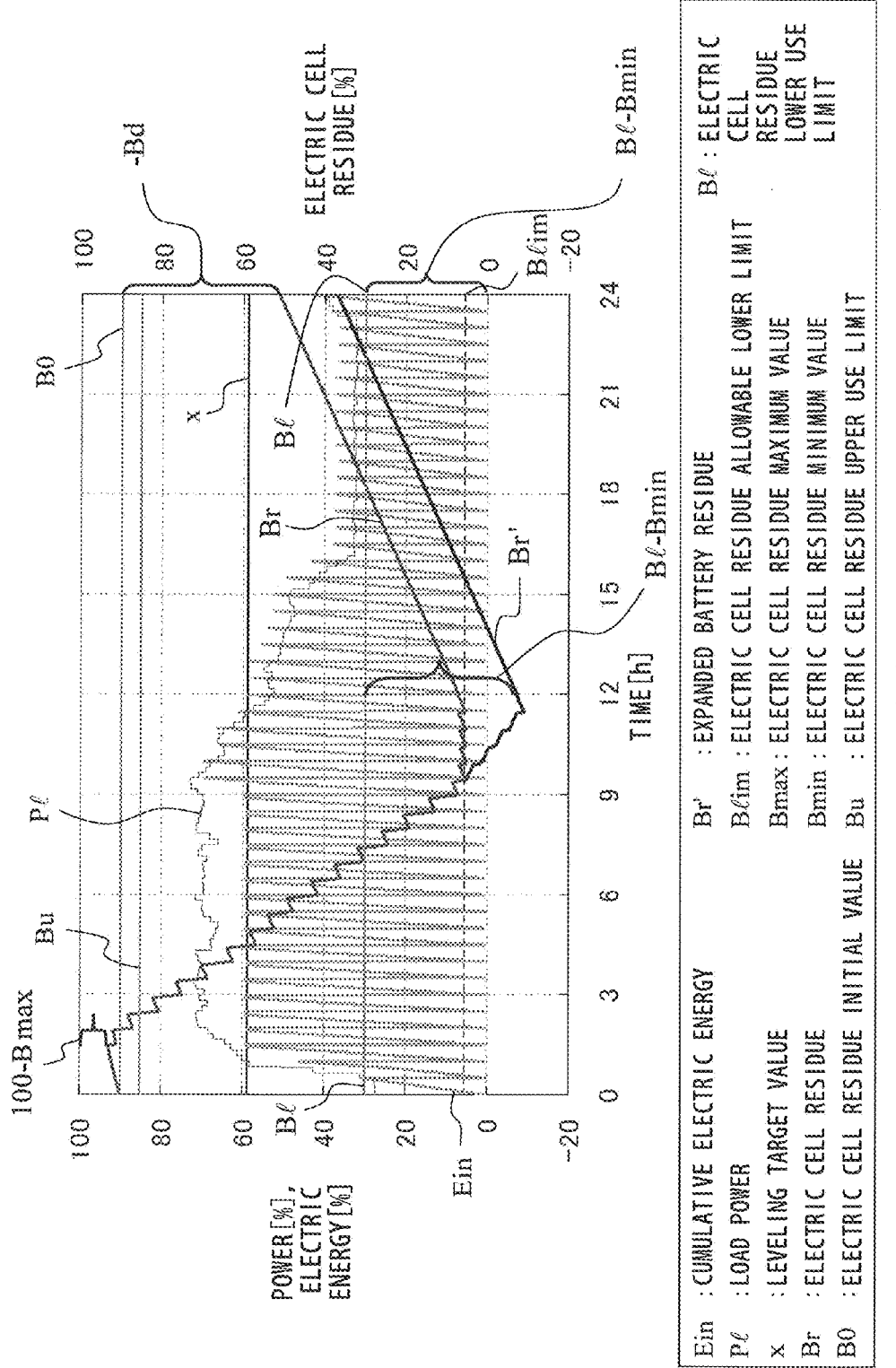
FIG. 18 is an explanatory view of the increment determining process of the leveling target value according to a variation example of the first embodiment.

FIG. 18 is an explanatory view of (4) above in the process for determining the increment of the leveling target value x. In FIG. 18, the horizontal axis indicates time, and the vertical axis indicates the power, the electric energy, and the electric cell residue. FIG. 18 illustrates an example of variations of the received power Pin, the cumulative electric energy Ein, the load power Pl, and the electric cell residue Br in the leveling period T0. In this example, the electric cell residue Br is regarded.

FIG. 18 illustrates the minimum value deficiency: Bl−Bmin, the balance deficiency: 0−Bd and the difference between the electric cell capacity Bc and the electric cell residue maximum value: 100−Bmax, and the electric cell residue lower use limit: Bl in the judgment in S111 in FIG. 16. The target determination unit 22 performs of these values a calculation with reference to the electric cell residue Br stored in the storage unit 24 at the end of the leveling period T0. That is, the target determination unit 22 judges what is the largest in the minimum value deficiency, the difference between the electric cell capacity and the electric cell residue maximum value, and the electric cell residue lower use limit as the deficiency of the electric cell residue as the change reference Bx for changing the leveling target value x. In this case, it is assumed that as the electric cell residue minimum value Bmin, the minimum value of the expanded electric cell residue Br' explained above with reference to FIG. 12. is used.

As described above, since the electric cell residue decrement (−Bd) is the deficiency independent of whether or not the electric cell residue minimum value Bmin is a negative value, it is use as a candidate as is. The difference=100−Bmax between the electric cell capacity and the electric cell maximum residue value refers to the electric cell capacity which has not been used up, and is a candidate for a surplus of the chargeable power. The electric cell residue lower use limit Bl is the value by which the minimum value of the actual electric cell residue Br (not the expanded electric cell residue Br') is lower than the lower use limit, and is used as a candidate to reserve the electric energy for the lower use limit. The logic above is expressed by the equation 4 above.

With reference to FIG. 16 again, the target determination unit 22 sets the variation dx=0.01×Bx×Bc/T0 (S112), replaces the leveling target value x=x+dx, and returns control to the process in FIG. 9 (S113).

Figure 19:
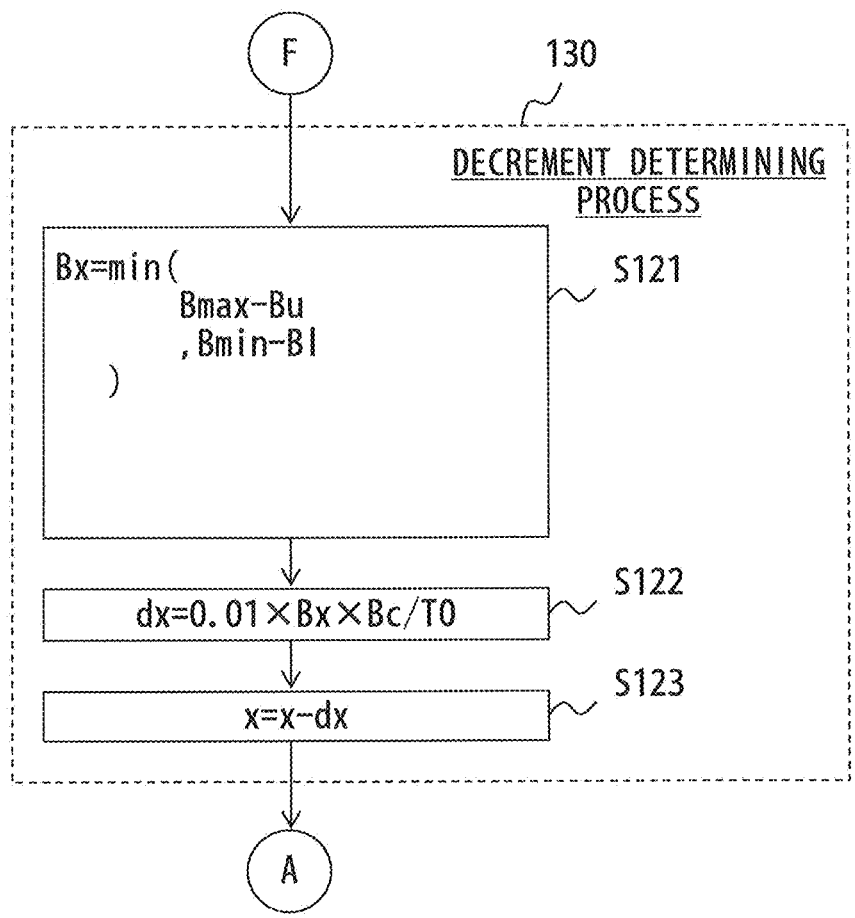
FIG. 19 is a flowchart of the decrement determining process according to a variation example of the first embodiment.

Next, the method of determining the decrement of the leveling target value x by the present variation example is described with reference to FIG. 19. FIG. 19 is a flowchart of a decrement determining process 130. As illustrated in FIG. 19, the target determination unit 22 defines the change reference Bx by the following equation 5 (S121).

$$Bx=\min(Bmax-Bu, Bmin-Bl) \quad \text{(equation 5)}$$

The equation 5 is similar to the processes in S101 through S103 in the decrement determining process 110 according to the first embodiment.

The target determination unit 22 sets the variation dx=0.01×Bx×Bc/T0 (S122), replaces the leveling target value x=x−dx, and returns control to the process in FIG. 9 (S123).

As explained above, according to the present variation example, the variation dx of the leveling target value x in the next leveling period T0 is calculated based on at least one of the electric cell residue maximum value Bmax, the electric cell residue minimum value Bmin, the in the present leveling period T0 electric cell balance Bd, and the electric cell residue lower use limit Bl, and the leveling target value x in the next leveling period T0 is changed.

For example, when the increasing operation is performed, the target determination unit 22 increases the leveling target value x by calculating the change reference Bx by the equation 4. When the decreasing operation is performed, the target determination unit 22 decreases the leveling target value x by calculating the change reference Bx by the equation 5.

Thus, the leveling target value x is changed so that the sum of the charged energy and the discharged energy of the electric cell 11 which change by changing the leveling target value x may be equal to the electric energy which changes by changing the leveling target value x. Thus, the power leveling system 1 may perform the leveling control appropriate for the status of the variable load 13.

In this case, since the variation dx depends on the excess-deficiency level of the electric cell residue Br, the leveling target value x appropriate for the situation of the power supply 3 and the variable load 13 may easily obtained in the next leveling period T0. Therefore, the peak of the received power Pin may be reduced, and the rise of the received power due to the residue deficiency of the electric cell 11 and the failure to reserve the necessary electric cell residue Br by the end of the leveling period T0 may be avoided. Therefore, the degradation of the leveling effect by the residue excess or deficiency of the electric cell 11 may be prevented, thereby realizing the power leveling system 1 as a system of a high leveling effect.

Second Embodiment

Next, the power leveling system according to the second embodiment is described below with reference to FIGS. 20 through 25. In the second embodiment, the configuration and operation similar to those according to the first embodiment are assigned the same reference numerals and the overlapping explanation is avoided. The second embodiment is a variation example of a method for determining the variation dx of the leveling target value x according to the first embodiment. Therefore, the configuration (Fcg. 1) of the power leveling system 1 and the process in FIG. 8 are the same as in the present embodiment.

Figure 20:
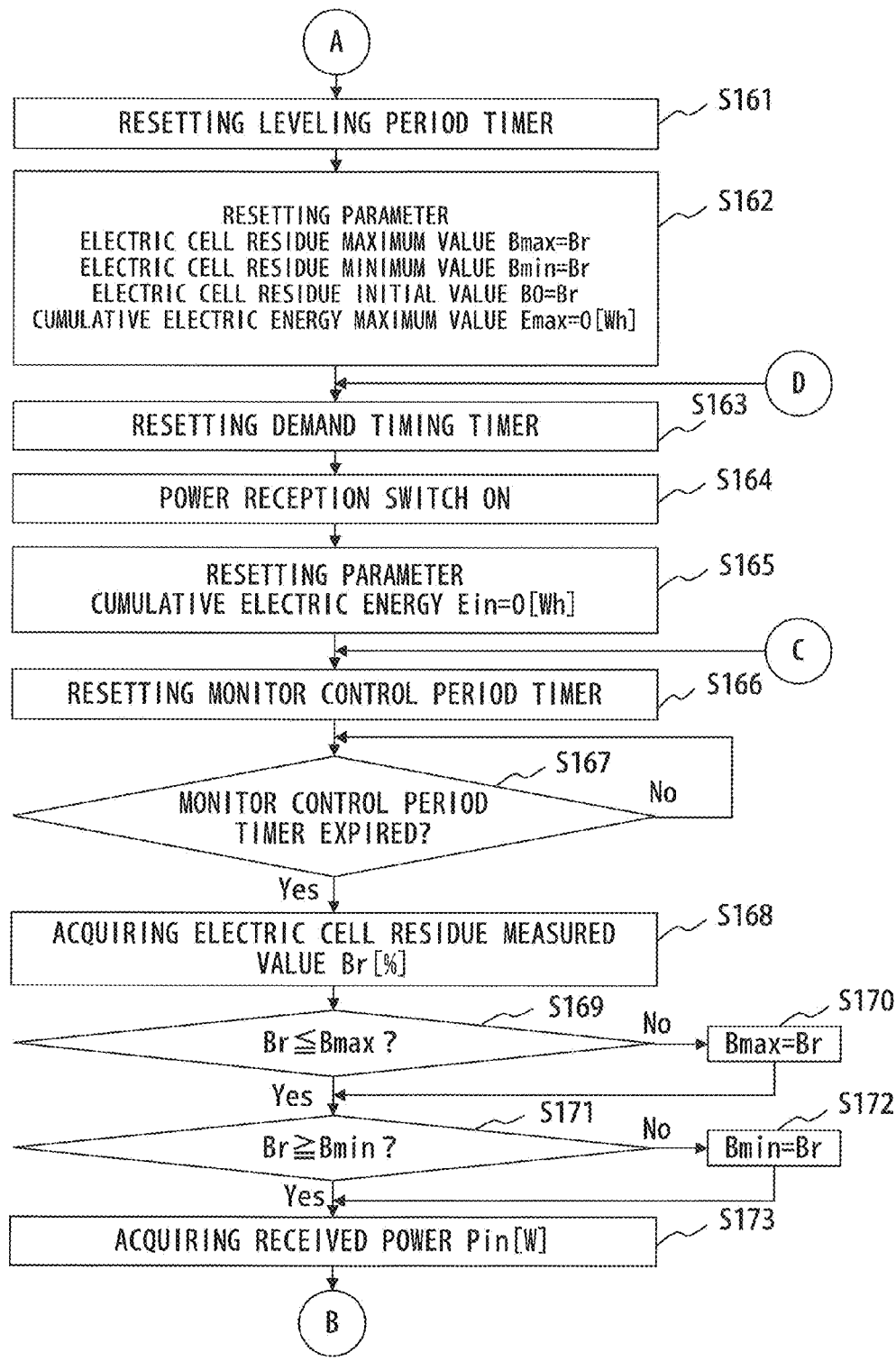
FIG. 20 is a flowchart of the operation of the power leveling system according to the second embodiment of the present invention.

FIG. 20 illustrates the process performed after the process in FIG. 8. As illustrated in FIG. 20, the target determination unit 22 resets the leveling period timer (not illustrated in the attached drawings) (S161). The target determination unit 22 also resets the electric cell residue maximum value Bmax to Br (%), the electric cell residue minimum value Bmin to Br (%), and the electric cell residue initial value B0 to Br, and sets the cumulative electric energy maximum value Emax=0 (Wh) (S162). Furthermore, the target determination unit 22 resets the demand timing timer (not illustrated in the attached drawings) (S163).

The target determination unit 22 outputs to the switch control unit 26 the operation signal to close the switch 5 and start the reception of power, and the switch 5 closes the connection at the instruction signal from the switch control unit 26. In this case, the electric cell 11 detects a normal input, and starts or continues the charging to own electric cell 11 and the supply of power from the power supply 3 to the load (S164). The target determination unit 22 resets the cumulative electric energy Ein to 0 (Wh) (S165), and also resets the monitor control period timer (not illustrated in the attached drawings) (S166).

The target determination unit 22 performs monitoring until the monitor control period timer expires (NO in S167). If it expires (YES in S167), the target determination unit 22 acquires the electric cell residue Br measured by the electric cell residue measurement unit 12, and stores it in the storage unit 24 (S168). The target determination unit 22 compares the acquired electric cell residue Br with the electric cell residue maximum value Bmax. When the electric cell residue Br is not more than the electric cell residue maximum value Bmax, control is passed to step S71 (YES in S169). When the electric cell residue Br is larger than the electric cell residue maximum value Bmax (NO in S169), the target determination unit 22 updates the electric cell residue maximum value Bmax to the electric cell residue Br (S170), stores it in the storage unit 24, and passes control to S171.

The target determination unit 22 compares the acquired electric cell residue Br with the electric cell residue minimum value Bmin. If the electric cell residue Br is not less than the electric cell residue minimum value Bmin, then control is passed to S173 (YES in S171). When the electric cell residue Br is smaller than the electric cell residue minimum value Bmin (NO in S171), then the target determination unit 22 updates the electric cell residue minimum value Bmin to the electric cell residue Br (S172), stores it in the storage unit 24, and passes control to S173. The target determination unit 22 acquires the received power Pin (W) by the received power measurement unit 9 (S173).

In the process in FIG. 21, the target determination unit 22 calculates the cumulative electric energy Ein=Ein+Pin×T2, and stores the result in the storage unit 24 (S181). The switch control unit 26 judges whether or not the cumulative electric energy Ein is not more than the cumulative electric energy maximum value Emax (S182). If it is judged that the cumulative electric energy Ein is not more than the cumulative electric energy maximum value Emax (YES in S182), then the switch control unit 26 passes control to S184. If it is judged that the cumulative electric energy Ein is larger than the cumulative electric energy maximum value Emax (NO in S182), the switch control unit 26 sets the cumulative electric energy maximum value Emax=the cumulative electric energy Ein (S183), and passes control to S184.

The switch control unit 26 compares the cumulative electric energy Ein calculated in S181 with the current leveling target value x. If the cumulative electric energy Ein is lower than the leveling target value x (NO in S184), then control is passed to S186. If the cumulative electric energy Ein calculated in S181 is not less than the leveling target value x (YES in S182), the switch control unit 26 outputs to the switch 5 the operation signal for disconnection, and the switch 5 shuts off the connection. In this case, the electric cell detects the disconnection of input, and starts or continues the supply of power to the load by the discharge (S183).

While the target determination unit 22 judges that the demand timing timer has not expired (NO in S186), the processes in S166 through S186 are repeated. If the target determination unit 22 judges that the demand timing timer has expired (YES in S186), it judges whether or not the leveling period timer has expired (S187). While the target determination unit 22 judges that the leveling period timer has not expired (NO in S187), then the processes in S163 through S187 are repeated. If the target determination unit 22 judges that the leveling period timer has expired (YES in S187), then it calculates the electric cell residue balance Bd=Br−B0 (S188), and passes control to a process 200 for determining the leveling target value x. In this case, the current electric cell residue Br may be stored as the final electric cell residue B in the storage unit 24.

In the process 200 for determining the leveling target value x, the target determination unit 22 judges whether or not the condition of the electric cell residue maximum value Bmax<the electric cell residue upper use limit Bu, or the electric cell residue minimum value Bmin<electric cell residue lower use limit Bl, or the electric cell residue balance Bd<0 is satisfied (S189). If the result of the judgment is a matching result, control is passed to FIG. 22 (YES in S189). If the result of the judgment is a non-matching result, control is passed to S190 (NO in S189). The target determination unit 22 judges whether or not the conditions of the electric cell residue maximum value Bmax>the electric cell residue upper use limit Bu, and the electric cell residue minimum value Bmin>electric cell residue lower use limit Bl, and the electric cell residue balance Bd>0 are satisfied (S190). If the result of the judgment is a matching result, then control is passed to FIG. 24. If the result is a non-matching result, control is returned to FIG. 20.

Figure 22:
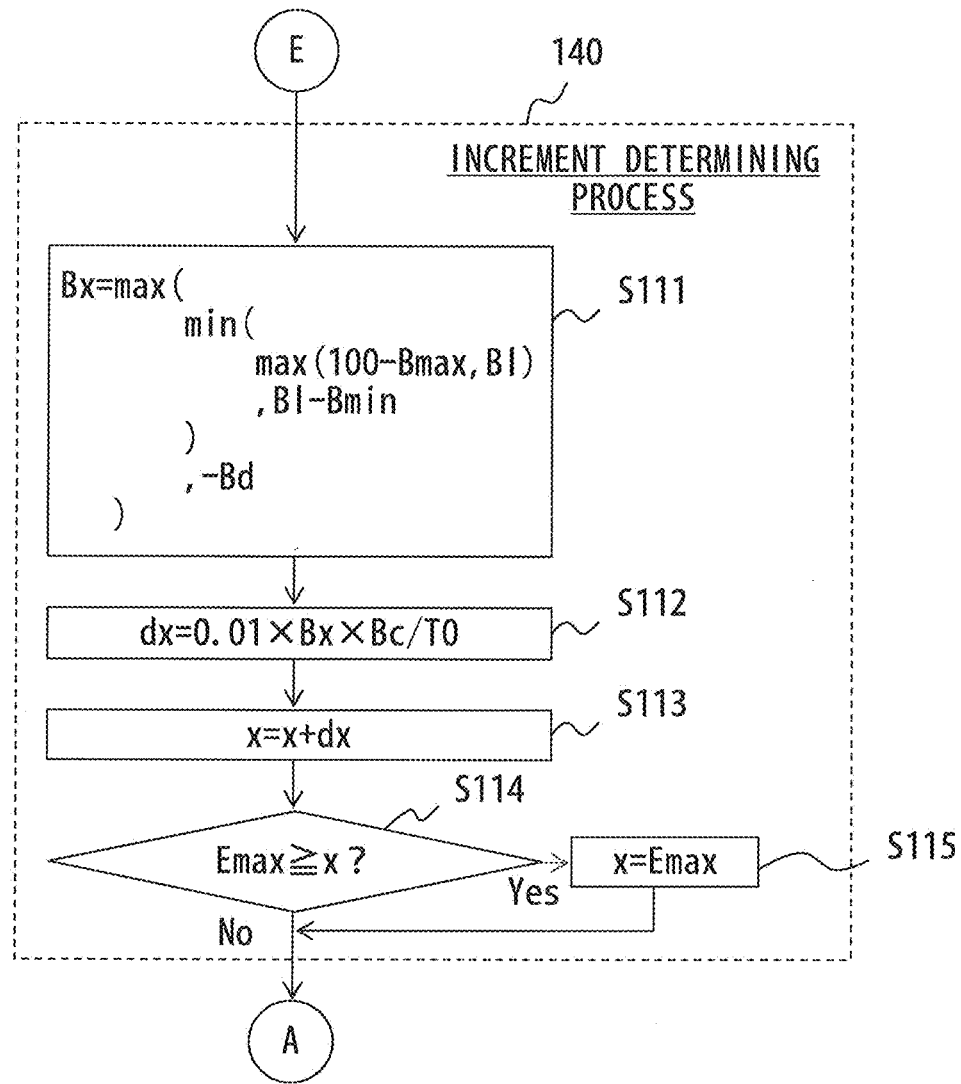
FIG. 22 is a flowchart of the increment determining process according to the second embodiment.
Figure 23:
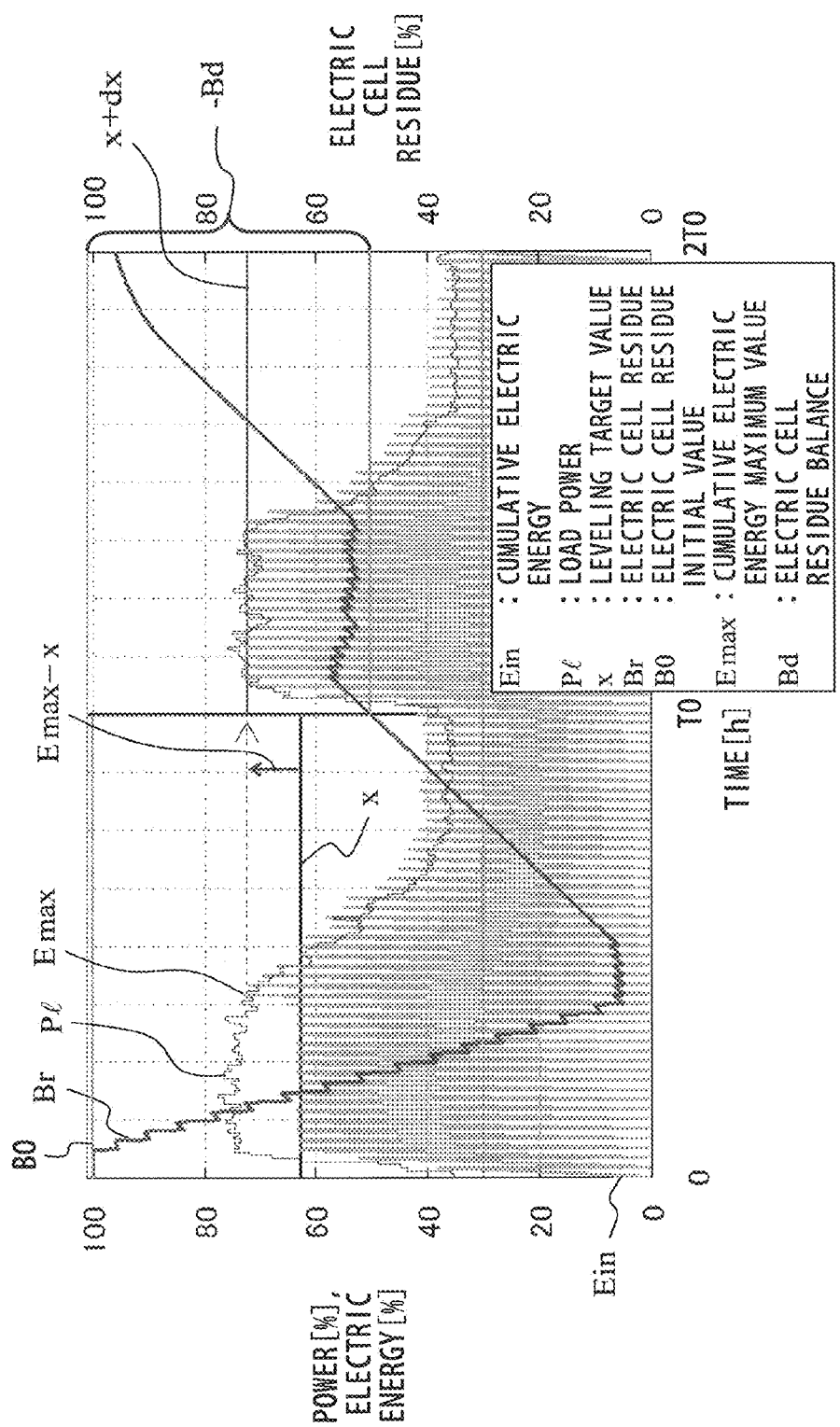
FIG. 23 is an example of variations of the cumulative electric energy Ein, the load power PL, and the electric cell residue Br in the two consecutive leveling periods T0 according to the second embodiment.

The increment determining process according to the second embodiment is described below with reference to FIGS. 22 and 23. FIG. 22 is an explanatory view of the increment determining process. In the process in FIG. 22, the processes in S111 through S113 are the same as the processes in S111 through S113 in FIG. 16. That is, as illustrated in FIG. 22, the target determination unit 22 determines the change reference Bx by the equation 4 above (S111).

The target determination unit 22 sets the variation dx=0.01×Bx×Bc/T0 (S112), and replaces the leveling target value x=x+dx (S113). The target determination unit 22 judges whether or not the cumulative electric energy maximum value Emax is not less than the leveling target value x (S114). If Emax x holds true (YES in S114), then the target determination unit 22 sets the leveling target value x as the cumulative electric energy maximum value Emax (S115), and returns control to the process in FIG. 8. If Emax≥x does not hold true (NO in S114), then control is returned to the process in FIG. 8.

The case in which the cumulative electric energy maximum value Emax is set as the leveling target value x is explained below with reference to FIG. 23. FIG. 23 illustrates an example of variations of the cumulative electric energy Ein, the load power Pl, and the electric cell residue Br in the two consecutive leveling periods T0. In FIG. 23, the horizontal axis indicates time, and the vertical axis indicates power, electric energy, and electric cell residue. In this example, the cumulative electric energy Ein and the electric cell residue Br are regarded.

As illustrated in S111, the target determination unit 22 calculates the change reference Bx by the equation 4 with reference to the electric cell residue Br stored in the storage unit 24. FIG. 23 illustrates the change reference Bx=electric cell residue balance deficiency=−Bd calculated in the leveling period T0 in the first period. For example, assume that the variation dx=0.42% is calculated based on the change reference Bx. On the other hand, in the first leveling period T0, the cumulative electric energy maximum value Emax which is higher than the leveling target value x occurs. The cumulative electric energy maximum value Emax is assumed to be higher than the next leveling target value x+dx=x+0.42(%).

In the power leveling system 1 according to the present embodiment, a demand contract for determining the basic fee as a 1-subsequent-year contract electric energy may be made based on the cumulative electric energy maximum value Emax for the cumulative electric energy Ein of the previous day. In this case, the cumulative electric energy maximum value Emax affects the one subsequent year. Therefore, immediately after the occurrence of the peak electric energy which is higher than the cumulative electric energy maximum value Emax of the period before the previous day, it is more important not to exceed the value than to reduce the peak value. Accordingly, the target value determined by the basic system is lower than the peak electric energy of the previous day, the value of the peak electric energy is set as the target value. Therefore, as the process in S115 in FIG. 22, the leveling target value x=cumulative electric energy maximum value Emax is set.

To be strict, the applicable value may be determined by the following equation 6 not to exceed the cumulative electric energy maximum value Emax of the previous day.

Next leveling target value ($x+dx$)=cumulative electric energy maximum value $E$max of the present round−cumulative electric energy maximum value $E$max×monitoring time $T2$/demand timing $T1$    (equation 6)

With the above-mentioned configuration, the peak of the cumulative electric energy Ein may be suppressed, thereby preventing the cumulative electric energy maximum value Emax of the previous round from being exceeded.

Figure 24:
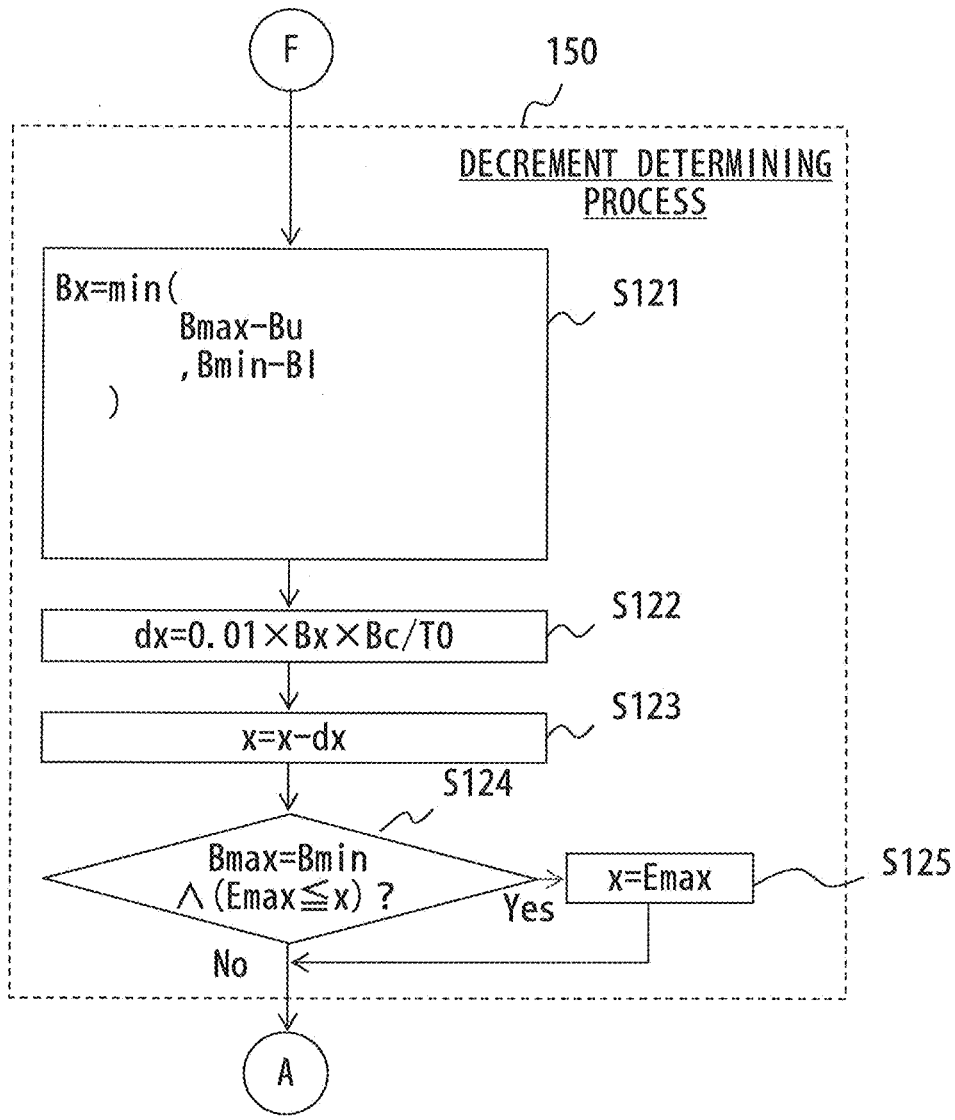
FIG. 24 is a flowchart of the decrement determining process according to the second embodiment.
Figure 25:
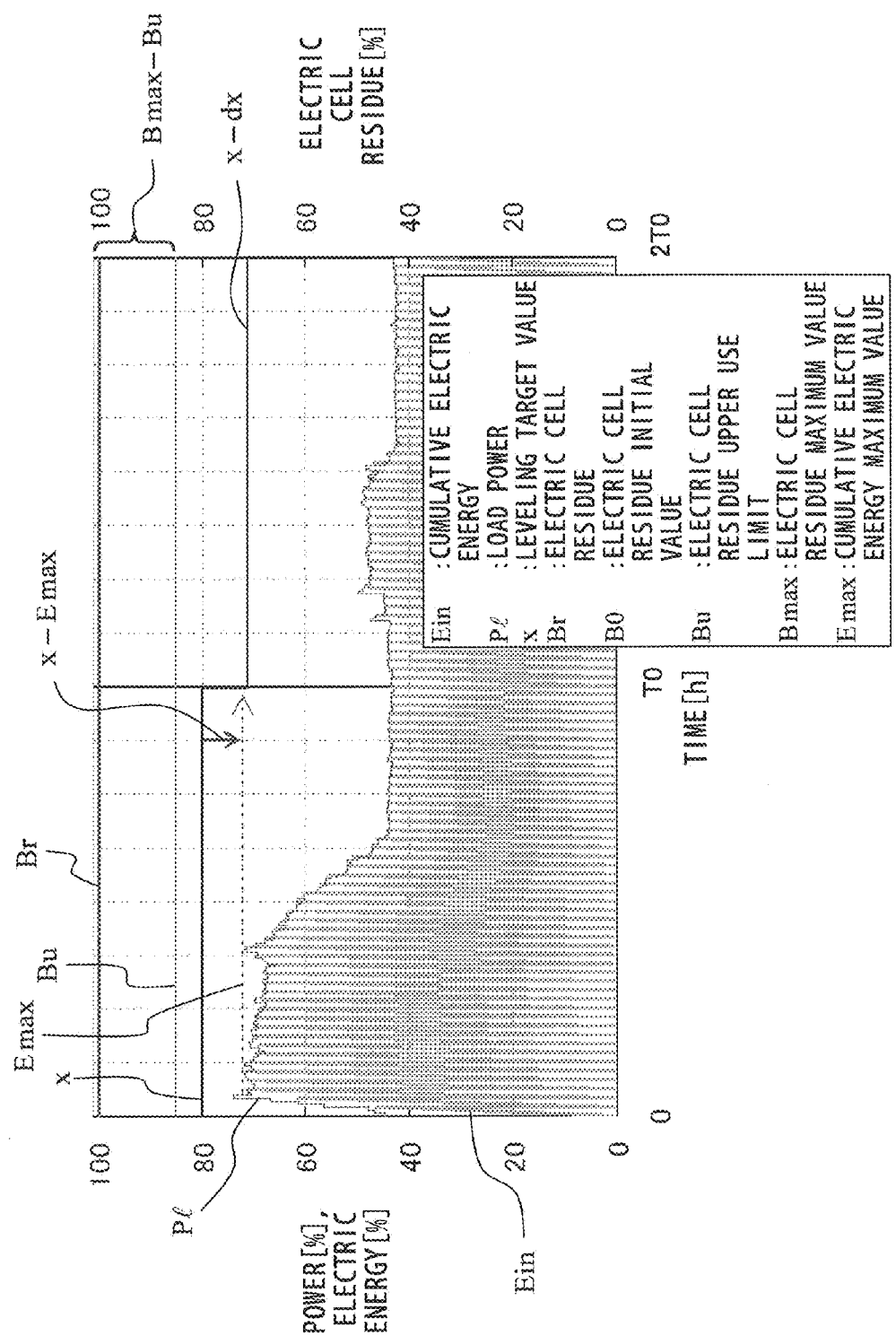
FIG. 25 is an example of variations of the cumulative electric energy Ein, the load power PL, and the electric cell residue Br in the two consecutive leveling periods T0 according to the second embodiment.

Next, the decrement determining process of the leveling target value x is described with reference to FIGS. 24 and 25. FIG. 24 is a flowchart of a decrement determining process of the leveling target value x. FIG. 25 is an explanatory view of the decrement determining process of the leveling target value x. As illustrated in FIG. 24, the target determination unit 22 determines the change reference Bx by the equation 5 above (S121).

In FIG. 25, the horizontal axis indicates time, and the vertical axis indicates power, electric energy, and electric cell residue. FIG. 25 illustrates an example of variations of the cumulative electric energy Ein, the load power Pl, and the electric cell residue Br. In this example, the electric cell residue Br is regarded. In the example in FIG. 25, the electric cell residue Br is approximately 100% in all the period. Since the electric cell residue upper use limit Bu is about 85% and the electric cell residue lower use limit Bl is about 30%, the residue excess<minimum value surplus=Bmin−Bl holds true. Therefore, FIG. 25 illustrates the residue excess=Bmax−Bu in the judgment in S121 in FIG. 24.

Back in FIG. 24, the target determination unit 22 refers to the electric cell residue Br stored in the storage unit 24, and judges the residual excess as the excess of the electric cell residue Br and as the change reference Bx for changing the leveling target value x. Then, the target determination unit 22 sets the variation dx=0.01×Bx×Bc/T0 (S122), replaces the leveling target value x=x−dx, and passes control to the process in S124 (S123).

The target determination unit 22 judges whether or not the condition of the electric cell residue maximum value Bmax=the electric cell residue minimum value Bmin, and the cumulative electric energy maximum value Emax the leveling target value x are satisfied (S124). When the conditions are satisfied, the target determination unit 22 sets the leveling target value x=the cumulative electric energy maximum value Emax (S125). When the conditions are not satisfied, control is directly returned to the process in FIG. 20.

In the example in FIG. 25, in the first leveling period T0, the fully charged state is constantly maintained throughout the leveling period T0. That is, the charge-discharge process has not occurred in the leveling period T0, and the amount of excess is not estimated only from the electric cell residue Br. There is the possibility that the charge-discharge process does not occur even when the leveling target value x is excessively large.

In the case of the first leveling period T0 in FIG. 25, the fully charged state is constantly maintained, and assume that the leveling target value x determined by the system according to the first embodiment and its variation example is, for example, dx=0.13(%). On the other hand, in the first leveling period T0, it is assumed that the cumulative electric energy maximum value Emax exceeds the leveling target value x by 4.5%. In this case, with the leveling target value x determined according to the first embodiment and its variation example, the excess is larger than the peak electric energy of the previous day. It is the case of YES in FIG. 24, and the target determination unit 22 sets the leveling target value x of the next leveling period T0 as the value of the cumulative electric energy maximum value Emax of the leveling period T0 immediately before.

To be strict, as with the leveling target initial value determining method, an applied value may be calculated by the following equation 7.

Next leveling target value $(x-dx)$=current cumulative electric energy maximum value $E$max−current cumulative electric energy maximum value $E$max×monitoring time $T2$/demand timing $T1$   (equation 7)

With the configuration above, the peak of the cumulative electric energy Ein may be suppressed, and the previous cumulative electric energy maximum value Emax may be prevented from being exceeded. The target determination unit 22 may detect the discharge of the electric cell 11 based on the state of the switch 5, and store the discharge result in the storage unit 24. Furthermore, the target determination unit 22 may store the received power Pin in the storage unit 24, calculate the peak value CF based on the received power Pin stored in the storage unit 24, and judge the presence/absence of the discharge.

As explained above, according to the power leveling system 1 of the second embodiment, the variation dx of the leveling target value x in the next leveling period T0 is calculated based on at least one of the electric cell residue maximum value Bmax, the electric cell residue minimum value Bmin, and the electric cell residue balance Bd in the leveling period T0, and the leveling target value x in the next leveling period T0 is changed.

For example, when the increasing operation is performed, the target determination unit 22 increases the leveling target value x based on whichever is larger between the minimum value deficiency=Bl−Bmin and the balance deficiency=0−Bd. Otherwise, the leveling target value x is increased based on Bx=max (min (max (100−Bmax, Bl), Bl−Bmin), −Bd). When the decreasing operation is performed, the target determination unit 22 decreases the leveling target value x based on whichever is smaller between the residue excess=Bmax−Bu and the minimum value surplus=Bmin−Bl.

Thus, the leveling target value x is changed so that the sum of the charged energy and the discharged energy of the electric cell 11 which change by changing the leveling target value x may be equal to the electric energy which changes by changing the leveling target value x. Thus, the power leveling system 1 may perform the leveling control appropriate for the status of the variable load 13.

In this case, since the variation dx depends on the excess-deficiency level of the electric cell residue Br, the leveling target value x appropriate for the situation of the power supply 3 and the variable load 13 may easily obtained in the next leveling period T0. Therefore, the peak of the received power Pin may be reduced, and the rise of the received power due to the residue deficiency of the electric cell 11 and the failure to reserve the necessary electric cell residue Br by the end of the leveling period T0 may be avoided. Therefore, the degradation of the leveling effect by the residue excess or deficiency of the electric cell 11 may be prevented, thereby realizing the power leveling system 1 as a system of a high leveling effect.

Furthermore, the next leveling target value x+dx to be increased by the method shove is compared with the current cumulative electric energy maximum value Emax. When the cumulative electric energy maximum value Emax is larger, the next leveling target value x is set as a value based on the cumulative electric energy maximum value Emax. Thus, the variation dx is determined by referring to the cumulative electric energy maximum value Emax as the value representing the transition of the cumulative electric energy Ein, thereby preventing the occurrence of the peak electric energy which exceeds the current cumulative electric energy maximum value Emax in the next leveling period T0.

In the case of the electric cell residue maximum value Bmax=the electric cell residue minimum value Bmin in the leveling period T0, the variation dx for the next leveling target value which is reduced by the method above is compared with the difference between the current cumulative electric energy maximum value Emax and the leveling target value x, and whichever is larger is defined as the variation dx. Thus, the variation dx is determined by referring to the cumulative electric energy maximum value Emax and the cumulative electric energy minimum value Emin which are the values representing the transition of the cumulative electric energy Ein. Thereby determining the next leveling target value x as a value appropriate for the state of the variable load 13 without a change of the electric cell residue Br with no discharge in the leveling period T0.

In the second embodiment, depending on the selection of the leveling target value increase condition and the judgment condition of the change reference Bx at the increase, or the selection of the leveling target value decrease condition and the judgment condition of the change reference Bx at the decrease, the Bx may be negative. In this case, it is preferable that Bx is set to 0 (Bx=0).

According to an aspect of the present invention, a leveling target value appropriate for the power facilities and the power usage situation of a load may be determined. That is, a leveling control device and a leveling control method with a higher peak reduction effect may be provided.

In the above-mentioned first embodiment and its variation example, and the second embodiment, the target determination unit 22 is an example of an electric cell residue acquisition unit, a target determination unit, and a power calculation unit, and the storage unit 24 is an example of a storage device.

Figure 26:
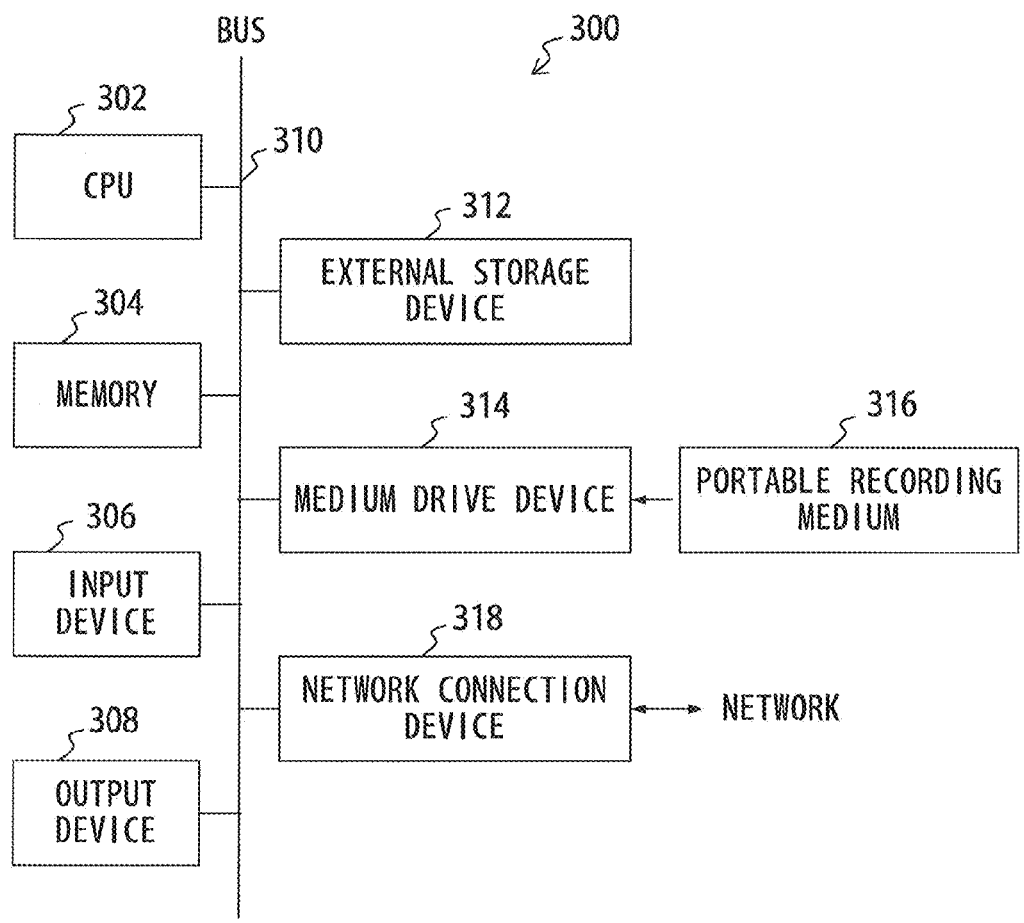
FIG. 26 is a configuration of a standard computer.

Described below is an example of a computer commonly applied to directing a computer to perform leveling control according to the above-mentioned first embodiment and its variation example, and the second embodiment. FIG. 26 is a block diagram of an example of the hardware configuration of a standard computer. As illustrated in FIG. 26, a computer 300 is connected to a central processing unit (CPU) 302, memory 304, an input device 306, an output device 308, an external storage device 312, a medium drive device 314, a network connection device 318, etc. through a bus 310.

The CPU 302 is an operation device for controlling the operation of the entire computer 300. The memory 304 is a storage unit for storing a program in advance, and for use as a work area as necessary when the program is executed. The memory 304 is, for example, random access memory (RAM), read only memory (ROM), etc. The input device 306 acquires an input of various types of information from a user of a computer associated with operation contents when the user operates the input device 306, and transmits the acquired input information to the CPU 302. The input device 306 may be, for example, a keyboard device, a mouse device, etc. The output device 308 outputs a result of the process performed by the computer 300, and includes a display device etc. For example, a display device displays a text and an image depending on the display data transmitted by the CPU 302.

The external storage device 312 is, for example, a storage device such as a hard disk etc., and stores various types of control programs executed by the CPU 302, acquired data, etc. The medium drive device 314 performs a write and a read to and from a portable recording medium 316. The CPU 302 may be designed to perform various types of controlling processes by reading a specified control program stored in the portable recording medium 316 through the recording medium drive device 314. The portable recording medium 316 is, for example, a compact disc (CD)-ROM, a digital versatile disc (DVD), universal serial bus (USB) memory, etc. The network connection device 318 is an interface device for managing communications of various types of data performed by a cable or wireless with an external unit. The bus 310 connects each of the above-mentioned devices and functions as a communication path for communicating data.

The program for directing the computer 300 to perform leveling control according to the above-mentioned first embodiment and its variation examples, and the second embodiment is stored in, for example, the external storage device 312. The CPU 302 reads the program from the external storage device 312, and performs an operation of power leveling control. In this case, a control program for directing the CPU 302 to perform the process of leveling control is first generated and stored in the external storage device 312. Then, a specified instruction is transmitted from the input device 306 to the CPU 302, and the control program is read from the external storage device 312 for execution. The program may be stored in the portable recording medium 316.

The present invention is not limited to the above-mentioned embodiments, but may be configured or embodied within the scope of the gist of the present invention. For example, determination of the variation dx of the leveling target value x is not limited to the determining method according to the first embodiment and its variation example, and the second embodiment. The variation dx determined based on a value representing the transition of the electric cell residue Br may be determined based on at least one of, for example, the maximum value, the minimum value, and the difference between the first and last values.

The power which is referred to when the variation dx is determined is explained above using an example of referring to the cumulative electric energy Ein obtained by accumulating received power from the power supply 3, but the value obtained by averaging the received power Pin from the power supply 3 per specified time may be used. Furthermore, the value obtained by averaging the power consumption of the variable load 13 per specified time, or the electric energy accumulated for a specified time period may be referred to.

The combinations used for determination of the variation dx increment and decrement are not limited to the combinations explained in the above-mentioned first embodiment and its variation example, and the second embodiment, but any combinations are acceptable. In determining the increase or decrease of the leveling target value x, the determining method explained in the first embodiment may be applied to other variation examples or embodiments.

Relating to the expanded electric cell residue Br', when there is no margin for the electric cell residue Br, there may be the case in which the deficiency is not compensated for by applying the electric cell residue value as is. In this case, the amount by which the electric cell residue minimum value is lower than the lower use limit based on the actual Br may be applied.

Furthermore, in any of the above-mentioned embodiments, the leveling control unit 20 may be realized as hardware such as a microcontroller.

All examples and conditional language provided herein are intended for pedagogical purposes of aiding the reader in understanding the invention and the concepts contributed by the inventor to further the art, and are to be construed as being limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A power leveling control device which levels power supplied from a power supply in a system in which the power supply is connected to an electric cell device and a load, the power leveling control device comprising:
    a storage device; and
    a processor configured to acquire a value of electric cell residue of the electric cell device in each monitoring time, to store the value of electric cell residue of the electric cell device in the storage device, to calculate an electric cell residue representative value indicating a transition of the electric cell residue in the period based on the stored value of electric cell residue at an end of a period in which it is predicted that a period of high power demand of a load and a period of low power demand alternately appear, to determine a leveling target value for power leveling which is used in the next period and changed by a variation by determining the variation with respect to a current leveling target value based on the electric cell residue representative value, and to control power to be supplied from the power supply and the electric cell device to the load based on a determined leveling target value for the power leveling for use in the next period.

2. The device according to claim 1, wherein the processor further
   calculates at least one of a maximum value, a minimum value, a first value, and a last value of the electric cell residue as the electric cell residue representative value in the leveling period when the leveling target value is determined;
   calculates at least one of a first difference between the maximum value and a specified first threshold, a second difference between the minimum value and a specified second threshold, and a third difference between the first value and the last value; and
   determines a leveling target value for use in a next period by determining a value obtained by dividing a calculated difference by a leveling period as a variation for a current value.

3. The device according to claim 2, wherein the first threshold is the electric cell residue upper use limit, the second threshold is an electric cell residue lower use limit.

4. The device according to claim 1, wherein the processor further
   acquires at least one of received power from the power supply, cumulative received electric energy obtained by accumulating the received power in each monitoring time until specified unit time each time a monitoring time, power consumption consumed by the load, and cumulative consumed electric energy obtained by accumulating the power consumption until a specified unit time;
   calculates average power or electric energy per unit time from at least one of the acquired received power, the cumulative received electric energy, and the consumed electric energy;
   stores the calculated average power of electric energy in the storage device; and
   determines a leveling target value for use in a next period by determining a variation of a leveling target value for power leveling to be used in the next period with respect to a current leveling target value based on the average power stored in the storage device, the average power in the electric energy or a value representing a transition of the electric energy.

5. The device according to claim 4, wherein the processor further determines a leveling target value for use in a next period by determining whichever is larger between a first variation candidate based on the electric cell residue representative value of the period and a second variation candidate based on the average power of the period or a value representing a transition of the average electric energy.

6. The variation according to claim 4, wherein the processor further determines a leveling target value for use in a next period by determining a variation of a leveling target value for power leveling for use in the next period with respect to a current leveling target value based on average power per unit time used in the storage device, a maximum value of the average power in electric energy per unit time, or a maximum value of the electric energy.

7. The device according to claim 6, wherein the processor further determines a leveling target value for use in a next period by determining a difference between a maximum value of average power per unit time stored in the storage device or a maximum value of electric energy per unit time and a current value of the leveling target value as a variation of a leveling target value for a leveling target value used in a next period with respect to a current leveling target value.

8. The device according to claim 2, wherein the processor further determines a leveling target value for use in a next period by determining an increment based on a value obtained by dividing whichever is larger between the second difference and the third difference by the leveling period.

9. The device according to claim 2, wherein the processor further determines a leveling target value for use in a next period by determining a decrement based on a value obtained by dividing whichever is smaller between the first difference and the second difference by the leveling period.

10. A power leveling control method for leveling power supplied from a power supply in a system in which the power supply is connected to an electric cell device and a load, the power leveling control method comprising:
    acquiring a value of electric cell residue of the electric cell device in each monitoring time by a processor;
    calculating an electric cell residue representative value indicating a transition of the electric cell residue in the period based on the stored value of electric cell residue at an end of a period in which it is predicted that a period of high power demand of a load and a period of low power demand alternately appear by the processor,
    determining a leveling target value for power leveling which is used in the next period and changed by a variation by determining the variation with respect to a current leveling target value based on the electric cell residue representative value by the processor; and
    controlling power to be supplied from the power supply and the electric cell device to the load based on a determined leveling target value changed by the variation for the power leveling for use in the next period by the processor.

11. The power leveling control method according to claim 10, further comprising:
    determining the leveling target value by the processor
    calculating at least one of a maximum value, a minimum value, a first value, and a last value of the electric cell residue as the electric cell residue representative value in the leveling period when the leveling target value is determined by the processor;
    calculating at least one of a first difference between the maximum value and a specified first threshold, a second difference between the minimum value and a specified second threshold, and a third difference between the first value and the last value by the processor; and
    determining a leveling target value for use in a next period by determining a value obtained by dividing a calculated difference by a leveling period as a variation for a current value by the processor.

12. The power leveling control method according to claim 11, wherein the first threshold is the electric cell residue upper use limit, and the second threshold is the electric cell residue lower use limit.

13. The power leveling control target value variation determining method according to claim 10, further comprising:
- acquiring received power from the power supply or electric energy, or power or electric energy consumed by the load by the processor;
- calculating average power per unit time or electric energy per unit time from an acquired value of the power acquisition unit, and storing a calculation result in a storage device by the processor;
- storing in the storage device the calculated average power or electric energy by the processor; and
- determining a leveling target value changed by a variation for power leveling for use in a next period by determining the variation with respect to a current leveling target value based on the stored average power, the average power or electric energy, or a value representing a transition of the electric energy by the processor.

14. The power leveling control method according to claim 13, wherein
the determining the leveling target value determines a leveling target value for power leveling for use in a next period by determining whichever is larger between a first variation candidate based on the electric cell residue representative value of the period and a second variation candidate based on the average power of the period and a value representing a transition of the average electric energy as the variation.

15. The power leveling control method according to claim 13, wherein
the determining the leveling target value determines a leveling target value for use in a next period by determining a variation with respect to a current leveling target value based on average power per unit time stored by the storage device or a maximum value of the average power in electric energy per unit time or a maximum value of the electric energy.

* * * * *